United States Patent
Burdette et al.

(10) Patent No.: US 8,312,740 B2
(45) Date of Patent: Nov. 20, 2012

(54) THERMAL REFLOW OF GLASS AND FUSED SILICA BODY

(75) Inventors: Steven Roy Burdette, Horseheads, NY (US); Polly Wanda Chu, Painted Post, NY (US); James Gerard Fagan, Painted Post, NY (US); Thomas William Hobbs, Postdam, NY (US); Sumalee Likitvanichkul, Painted Post, NY (US); Daniel Raymond Sempolinski, Painted Post, NY (US); Terry Lee Taft, Big Flats, NY (US); Michael John Walters, Postdam, NY (US)

(73) Assignee: Corning Incorporated, Corning, NY (US)

( * ) Notice: Subject to any disclaimer, the term of this patent is extended or adjusted under 35 U.S.C. 154(b) by 224 days.

(21) Appl. No.: 12/275,620

(22) Filed: Nov. 21, 2008

(65) Prior Publication Data

US 2009/0095022 A1  Apr. 16, 2009

Related U.S. Application Data

(62) Division of application No. 11/498,866, filed on Aug. 3, 2006, now abandoned.

(60) Provisional application No. 60/716,457, filed on Sep. 12, 2005.

(51) Int. Cl.
*C03B 23/045* (2006.01)
*C03B 23/051* (2006.01)
*C03B 23/055* (2006.01)

(52) U.S. Cl. ............................................. 65/67; 65/64

(58) Field of Classification Search .............. 65/65, 102, 65/103, 104, 108, 244, 268, 276, 280, 292, 65/294, 296, 382, 401, 404, 109, 110
See application file for complete search history.

(56) References Cited

U.S. PATENT DOCUMENTS

| | | | |
|---|---|---|---|
| 3,740,207 A * | 6/1973 | Bogrets | 65/67 |
| 4,358,306 A | 11/1982 | Okamoto et al. | |
| 4,810,276 A * | 3/1989 | Gilliland | 65/421 |
| 5,443,607 A | 8/1995 | Englisch et al. | |
| 5,683,483 A * | 11/1997 | Yosiaki et al. | 65/102 |
| 6,143,676 A | 11/2000 | Ohashi et al. | |
| 6,415,630 B1 * | 7/2002 | Coriand et al. | 65/57 |
| 6,689,516 B2 | 2/2004 | Berkey et al. | |
| 2003/0056537 A1 * | 3/2003 | Marley et al. | 65/17.3 |
| 2003/0115904 A1 | 6/2003 | Kuhn et al. | |
| 2003/0115905 A1 | 6/2003 | Kuhn et al. | |
| 2004/0151433 A1 | 8/2004 | Galstain et al. | |
| 2006/0137398 A1 * | 6/2006 | Bleaking et al. | 65/17.3 |

FOREIGN PATENT DOCUMENTS

| | | |
|---|---|---|
| DE | 19521072 C1 | 11/1996 |
| EP | 0607433 A1 | 7/1994 |
| JP | 2003212575 A | 7/2003 |
| JP | 2005029413 A | 2/2005 |
| WO | 0055100 A1 | 9/2000 |

* cited by examiner

*Primary Examiner* — Matthew Daniels
*Assistant Examiner* — Cynthia Szewczyk
(74) *Attorney, Agent, or Firm* — Robert P. Santandrea; Siwen Chen

(57) ABSTRACT

Disclosed are synthetic silica glass body with a birefringence pattern having low fast axis direction randomness factor and glass reflow process. The glass reflow process comprises steps of: providing a glass tube having a notch; and thermally reflowing the glass tube to form a glass plate. The process can be advantageously used to produce fused silica glass plate without observable striae when viewed in the direction of optical axis. Also disclosed are optical members comprising the fused silica glass body and a process for reflowing glass cylinders.

52 Claims, 13 Drawing Sheets

B

C

THERMAL REFLOW OF GLASS AND FUSED SILICA BODY

CROSS-REFERENCE TO RELATED APPLICATION

The present application is a divisional application of U.S. patent application Ser. No. 11/498,866, filed on Aug. 3, 2006 now abandoned, entitled "Thermal Reflow of Glass and Fused Silica Body," and claims priority to U.S. Provisional Patent Application Ser. No. 60/716,457 under 35 U.S.C. §119, filed on Sep. 12, 2005 and entitled "Thermal Reflow of Glass and Fused Silica Articles," the content of which is relied upon and incorporated herein by reference in its entirety.

FIELD OF THE INVENTION

The present invention relates to method of making glass articles by thermal reflow of glass and fused silica articles made by such method. In particular, the present invention relates to thermal reflow of glass tubes, as wall as silica glass bodies thus produced. The present invention is useful, for example, in producing high purity fused silica plates from consolidated glass cylinder produced by using the OVD and IVD processes.

BACKGROUND OF THE INVENTION

Conventional methods for making plate glass include the float method, pressing and rolling. These methods have been used successfully in producing soda-lime glasses and other glasses having a relatively low softening temperature.

For glass materials with high softening temperatures, such as fused silica glass, these methods either cannot be used (such as the float method using tin bath), or must be adapted to accommodate the high processing temperatures.

In many applications, high composition and property homogeneity of the glass used is required. For example, synthetic silica glass for use as optical members in precision lithography tools operating in deep and vacuum UV regions, such as at about 248 nm or 193 nm, is required to have a very high purity, very high compositional homogeneity and property homogeneity in terms of concentrations of metal ions and distribution thereof, OH concentrations and distribution thereof, refractive index and variation thereof, transmission and variation thereof, laser damage resistance, birefringence and variation thereof, fictive temperature and variation thereof, and the like.

The conventional glass forming techniques mentioned above, such as the glass plate forming technologies, cannot be easily adapted for use in making high purity fused silica plate meeting the stringent compositional and property requirements of the demanding applications mentioned above.

High purity synthetic silica glass are typically made via flame hydrolysis methods, such as outside vapor deposition ("OVD"), inside vapor deposition ("IVD"), vertical axial deposition ("VAD"), direct-to-glass methods, and the like. The glasses obtained directly from these processes tend to have compositional and property inhomogeneity within the bulk. For example, striae caused by compositional and/or refractive index variations may exist in glass cylinders obtained by OVD, IVD and VAD processes. Glasses made from these processes oftentimes need to be reshaped to a plate or other configuration before further processing into optical elements. It is highly desired that such striae be removed or minimized during such reshaping for demanding applications, at least in the direction of the use axis of the glass.

However, conventional thermal reflow of the glass cylinder or pressing does not reduce the striae to a desired level for many demanding applications. Indeed, direct pressing of an OVD, IVD and VAD fused silica cylinder can lead to striae present and observable in the direction of the optical axis of the glass.

As a result, various methods have been proposed in making fused silica glass having a high level of homogeneity at least in the direction of the optical axis. These methods include reshaping processes and/or homogenization processes. However, these currently existing approaches are limited in their ability to accomplish the task.

For example, Berkey and Moore (U.S. Pat. No. 6,689,516 B2) identified a means to fabricate plates from OVD blanks, however the process is limited to thickness up to ~16 mm. This process requires use of elaborate fixturing to assist in reshaping (stretching) the glass with secondary thermal processing to provide plate straightening. Other approaches employ the use of molds (U.S. Pat. No. 5,443,607); apply force using various fixture designs (U.S. Pat. Nos. 4,358,306, 5,443,607, United States Patent Application Publication Nos. 20030115904A1 and 20030115905A1) to provide means for homogenizing the fused silica glass via reorienting, twisting or mixing striae and/or compositional gradients. The use of these methods either are limited in terms of the maximum mass, relative effectiveness for striae mixing, or are elaborate methods which may induce inclusions and other defects in the glass due to extensive or multiple twisting and kneading operations on the glass surfaces to get the desired mixing action.

Moreover, it has been found that fused silica glass plates produced by the prior art methods tend to have an undesired level of randomness factor in terms of the fast axis directions of the birefringence map.

Therefore, there remains the need for a process for reshaping and/or homogenizing glass materials, particularly those having compositional and/or property variations in the bulk, wherein the impact of such compositional/property variations are reduced or minimized. There is also a need for high purity fused silica glass having a low level of randomness in terms of the fast axis directions in its birefringence map.

The present invention satisfies these needs.

SUMMARY OF THE INVENTION

Accordingly, in a first aspect of the present invention, it is provided a synthetic silica glass body having an optical axis and a birefringence pattern measured in a plane perpendicular to the optical axis in which the fast axis directions of the measured birefringence pixels have a randomness factor of between −0.50 and 0.50, preferably between −0.40 and 0.40, more preferably between −0.30 and 0.30. In certain embodiments, the randomness factor is between −0.20 and 0.20. Preferably, when viewed in the direction of the optical axis of the silica glass body, it is essentially free of striae. More preferably, when viewed in at least one direction perpendicular to the optical axis of the silica body, it is essentially free of striae. In one embodiment of the glass body of the present invention, it is a plate having two essentially flat and essentially parallel major surfaces, each major surface having an area of at least 1 $cm^2$, preferably at least 4 $cm^2$, more preferably at least 16 $cm^2$. In certain embodiments, each of the major surfaces has an area of at least 100 $cm^2$. In other embodiments, each of the major surfaces has an area of at least 225 $cm^2$, such as about 400 $cm^2$, 625 $cm^2$, 900 $cm^2$, or even larger.

Preferably, the synthetic silica glass body of the present invention has a refractive index variation $\Delta n$ as measured in a plane perpendicular to the optical axis, wherein $\Delta n \leq 10$ ppm, preferably $\Delta n \leq 5$ ppm, more preferably $\Delta n \leq 2$ ppm, most preferably $\Delta n \leq 1$ ppm.

Preferably, the synthetic silica glass body of the present invention has an internal transmission at about 193 nm of at least about 99.65% cm$^{-2}$, more preferably at least 99.70% cm$^{-1}$, still more preferably at least 99.75% cm$^{-1}$, still more preferably at least 99.80% cm$^{-1}$, most preferably at least 99.85% cm$^{-1}$.

Preferably, the synthetic silica body of the present invention has a low level of LIWFD.

Preferably, the synthetic silica body of the present invention has a birefringence of less than 5 nm/cm, preferably less than 3 nm/cm, more preferably less than 1 nm/cm, most preferably less than 0.5 nm/cm, when measured in a plane perpendicular to the optical axis.

Preferably, the synthetic silica body of the present invention has a fictive temperature of lower than 1150° C., preferably lower than 1050° C., more preferably lower than 1000° C., most preferably lower than about 900° C.

A second aspect of the present invention is an optical element having an optical axis which is made from the synthetic silica body is described summarily above and in greater detail below. Preferably, the optical axis of the optical element is parallel to the optical axis of the synthetic silica body. In a preferred embodiment, the optical element is a lens element for use in lithographic device operating in deep or vacuum UV wavelength regions, such as about 248 nm, 193 nm and shorter.

A third aspect of the present invention is a process for making glass plate, comprising the following steps:

(I) providing a ready-to-flow notched glass tube having (a) a longitudinal center axis, and (b) an identified section between two cross-sections perpendicular to the tube center axis having a longitudinal section length $L_1$; and (c) a longitudinal notch in the direction of the tube center axis of the ready-to-flow notched glass tube through the tube wall; and (II) thermally reflowing the ready-to-flow notched glass tube at an elevated temperature to form a glass plate. Preferably, the notch of the ready-to-flow notched glass tube has a center plane essentially parallel to the tube center axis of the ready-to-flow notched glass tube. Preferably, in step (II), the glass plate is formed to have two major surfaces and an optical axis essentially perpendicular to the two major surfaces. Preferably, in step (II) of the process of the present invention, the notched side and the notch of the glass tube face upwards and the notched side is placed on the surface of a support.

The process of the present invention is particularly advantageous in forming glass plates from glass rubes having striae, such as essentially circular striae when viewed in the direction of the rube center axis.

In a preferred embodiment of the process of the present invention, the glass tube is made of consolidated fused silica material.

In a preferred embodiment of the process of the present invention, the glass is high purity consolidated silica and step (II) is conducted in the presence of a purifying atmosphere comprising a cleansing gas. Preferably, the cleansing gas comprised in the purifying atmosphere is selected from $F_2$, $Cl_2$, $Br_2$ and halogen-containing compounds, and compatible mixtures thereof. The halogen-containing compounds may be selected from HF, HCl, HBr and compounds represented by the general formula $C_aS_bX_c$, where X is F, Cl, Br and combinations thereof, a, b and c are non-negative integers meeting the valency requirements of the individual elements.

The present invention process is particularly advantageous for thermal reflow of consolidated silica glass cylinders made by using the soot-to-glass processes, such as the OVD, IVD and VAD processes, especially those glass cylinders having circular striae when viewed in the direction of its longitudinal axis.

In a preferred embodiment of the process of the present invention, in step (I), the notch is formed to have a center plane passing through the tube center axis of the ready-to-flow notched glass tube, and the two sides of the notch beside the center plane are essentially symmetric around the center plane.

In a preferred embodiment of the process of the present invention, in step (I), the notch is formed to have an essentially rectangular cross-section when cut by a plane perpendicular to the tube center axis of the ready-to-flow notched glass tube.

In a preferred embodiment of the process of the present invention, in step (I), the notch is formed to have an essentially truncated "V" shape cross-section when cut by a plane perpendicular to the tube center axis of the ready-to-flow notched glass tube.

In a preferred embodiment of the process of the present invention, in step (I), the provided ready-to-flow notched glass tube has a cross-section that is part of a ring-shape defined by an essentially circular outer boundary having a diameter of $OD_1$ and an essentially circular inner boundary having a diameter of $ID_1$ when cut by a plane perpendicular of the tube center axis of the tube. Preferably, the outer circular boundary and the inner circular boundary are concentric. In one embodiment, however, the outer circular boundary and the inner circular boundary are eccentric. In this latter embodiment, it is preferred that in step (I), the notch is formed at the location such that the center plane of the notch is located where the thickness of the wall of the ready-to-flow notched glass tube is essentially the minimal.

In yet another preferred embodiment of the process of the present invention, in step (II), the identified section of the ready-to-flow notched glass tube is formed into a glass plate having two essentially flat major surfaces, a width of a first major flat surface of $L_3$, a width of a second major surface of $L_4$, $L_4 \geq L_3$, a length of both major surfaces of $L_2$, and a thickness between the two essentially flat major surfaces of T. Preferably, $L_1 \leq L_2 \leq 2L_1$, more preferably $L_1 \leq L_2 \leq 1.5L_1$, still more preferably $L_1 \leq L_2 \leq 1.2L_1$. In a preferred embodiment of the process of the present invention, $L_4 \geq L_3 \geq 0.8 L_4$, preferably $L_4 \geq L_3 \geq 0.9L_4$, more preferably $L_4 \geq L_3 \geq 0.95L_4$.

In a preferred embodiment of the process of the present invention, in step (II), the identified section of the ready-to-flow notched glass tube is formed into a glass plate having two essentially flat major surfaces, a width of a first major flat surface of $L_3$, a width of a second major surface of $L_4$, $L_4 \geq L_3$, a length of both major surfaces of $L_2$, and a thickness between the two essentially flat major surfaces of T. It is preferred that $0.5(\pi \cdot OD_1 - L_{arc}) \leq L_4 \leq 2(\pi \cdot OD_1 - L_{arc})$, preferably $0.5(\pi \cdot OD_1 - L_{arc}) \leq L_4 \leq 1.8(\pi \cdot OD_1 - L_{arc})$, more preferably $0.7(\pi \cdot OD_1 - L_{arc}) \leq L_4 \leq 1.5(\pi \cdot OD_1 - L_{arc})$, where $L_{arc}$ is the outer arc length of the notch. It is also preferred that $L_3 \geq 1.0 \cdot \pi \cdot ID_1$, more preferably $L_3 \geq 1.5\pi \cdot ID_1$, still more preferably $L_3 \geq 2\pi \cdot ID_1$, still more preferably $L_3 \geq 3\pi \cdot ID_1$. Meanwhile, it is also preferred that $0.10 \cdot (OD_1 - ID_1) \leq T \leq 0.45 \cdot (OD_1 - ID_1)$, preferably $0.10 \cdot (OD_1 - ID_1) \leq T \leq 0.40 \cdot (OD_1 - ID_1)$, more preferably $0.10 \cdot (OD_1 - ID_1) \leq T \leq 0.30 \cdot (OD_1 - ID_1)$.

Preferably, in the process of the present invention:

in step (II), the identified section of the ready-to-flow notched glass tube forms an identified glass plate having two essentially flat major surfaces, a width of the first major flat surface of $L_3$, a width of a second major surface of $L_4$, $L_4 \geq L_3$, a length of both major surfaces of $L_2$, and a thickness between the two essentially flat major surfaces of T; and measured in a plane perpendicular to the optical axis of the identified glass plate, the identified glass plate upon edge removal and surface lapping with a surface area of about $L_3 \cdot L_2$ has a birefringence pattern in which the fast axis directions have a randomness factor of between −0.50 and 0.50, preferably between −0.40 and 0.40, more preferably between −0.30 and 0.30.

In one embodiment of the process of the present invention, step (I) comprises the following steps:

(Ia) providing a precursor glass tube having (a) a longitudinal tube center axis, and (b) an identified section between two cross-sections perpendicular to the tube center axis having a longitudinal section length $L_1$; and (Ib) forming a notch in a direction parallel to the tube center axis of the precursor glass tube through the tube wall, whereby the ready-to-flow notched glass tube is formed.

In a preferred embodiment, the glass is silica and step (Ia) comprises the following steps:

(Ia1) forming a silica soot preform by the OVD process on a mandrel;

(Ia2) consolidating the silica soot preform into fused silica glass without previously removing the mandrel; and (Ia3) removing the mandrel to form the precursor glass tube.

In another preferred embodiment, the glass is silica and step (Ia) comprises the following steps:

(Ia1) forming a silica soot preform by the OVD process on a mandrel;

(Ia2) removing the mandrel from the soot preform; and (Ia3) consolidating the silica soot preform into fused silica glass, whereby the precursor glass tube is formed.

In yet another preferred embodiment, the glass is silica and step (Ia) comprises the following steps:

(Ia1) forming a silica soot preform by the OVD process on a glass tube mandrel; and (Ia2) consolidating the silica soot preform into fused silica glass without previously removing the mandrel, whereby the precursor glass tube is formed.

In this preferred embodiment, the process comprises the following step (III) after step (II):

(III) removing the surface part of the glass plate resulting from the glass tube mandrel.

According to another preferred embodiment, the glass is silica and step (Ia) comprises the following steps:

(Ia1) forming a silica soot preform by the IVD process on the inner surface of an outside tube;

(Ia2) consolidating the silica soot preform into fused silica glass without previously removing the outside tube; and (Ia3) removing the outside tube to form the precursor glass tube.

According to another preferred embodiment, the glass is silica and step (Ia) comprises the following steps:

(Ia1) forming a silica soot preform by the IVD process on the inner surface of an outside tube;

(Ia2) removing the outside tube from the soot preform; and (Ia3) consolidating the silica soot preform into fused silica glass, whereby the precursor glass tube is formed.

According to yet another preferred embodiment, the glass is silica and step (Ia) comprises the following steps:

(Ia1) forming a silica soot preform by the IVD process on the inner surface of an outside tube; and (Ia2) consolidating the silica soot preform into fused silica glass without previously removing the outside tube, whereby the precursor glass tube is formed.

In this preferred embodiment, it is further preferred that it comprises the following step (III) after step (II):

(III) removing the surface part of the glass plate resulting from the outside tube.

It is further preferred that step (Ia) comprises the following steps:

(I0) providing a precursor glass cylinder having a precursor cylinder axis, a length $L_0$ in the direction of the precursor cylinder axis and a precursor cylinder outer diameter $OD_0$;

(I1) thermally reflowing in the longitudinal direction of the precursor glass cylinder, with optional pressing; and (I2) optionally drilling in a direction essentially parallel to the precursor cylinder axis to form a cylindrical inner cavity, whereby the precursor glass tube is formed to have a longitudinal tube axis, an outer diameter $OD_1$ and a length $L_1$ in the direction of the tube axis, where the tube axis is essentially parallel to the precursor cylinder axis of the precursor glass cylinder, $L_1 < L_0$, and $OD_1 > OD_0$. Preferably, the tube axis is the same as the precursor cylinder axis of the precursor glass cylinder.

In the preferred embodiment described above, $0.3L_0 \leq L_1 \leq 0.8L_0$.

In the preferred embodiment described above, it is preferred that:

in step (I0), the precursor glass cylinder comprises an inner glass cane; said inner glass cane is located approximately at the center of the precursor glass cylinder and has a diameter of $ID_0$; The glass cane may optionally have the same or a differing composition and/or properties than the glass surrounding the inner glass cane; and in step (I2), the inner glass cane is essentially completely removed.

In an embodiment of the process of the present invention, in step (I0), the precursor glass cylinder comprises a mandrel in essentially the central portion. The mandrel may be maintained in place during step (I2), and removed after step (I2). In one embodiment, the dimension of the mandrel is essentially not changed during step (I2). In one embodiment, the mandrel is inserted into a glass tube. In another embodiment, in step (I0), the precursor glass cylinder comprises an outside tube having differing composition and/or properties. In this embodiment, it is further preferred that the process comprises the following step (III) after step (II):

(III) removing the surface part of the glass plate resulting from the outside tube.

In this preferred embodiment of the process of the present invention, it is further preferred that after step (I2), the ready-to-flow notched glass tube has an inner cylindrical cavity with a diameter $ID_1$, and $OD_0 - ID_0 < OD_1 - ID_1$.

In an embodiment of the process of the present invention, in step (I0), the provided precursor glass cylinder has an inner cylindrical cavity the axis of which is parallel to the precursor cylinder axis, and the inner cylindrical cavity has a diameter of $ID_0$. Preferably, an inner cylindrical cavity with a diameter $ID_1$, and $OD_0 - ID_0 < OD_1 - ID_1$. A mandrel may be inserted into the inner cylindrical cavity of the precursor glass cylinder during steps (I) and/or (II).

In one embodiment of the process of the present invention, in step (II), the reflow is done without external mechanical assistance. The external force exerted on the glass tube during reflow other than those by the vessel in which the reflow is carried out may include only gravity of the glass tube, or additional force.

In one embodiment of the process of the present invention, external forces other than gravity of the glass tube are exerted on the ready-to-flow notched glass tube to facilitate the reflow of the glass. Such external forces other than gravity of the glass tube may be exerted to the two side surfaces of the ready-to-flow notched glass tube and/or to the surfaces of the inner cavity thereof. In a preferred embodiment, the external force is applied by a plunger to the surfaces of the inner cavity and/or the side surfaces of the notch. In another preferred embodiment, the external force is applied via an articulating mandrel and a plunger.

In another embodiment of the process of the present invention, step (II) comprises the following steps:

(IIa) placing the ready-to-flow notched glass-tube on an essentially horizontal longitudinal mandrel, with the mandrel inserting into the inner cavity of the tube, and the notch placed facing sideways;

(IIb) allowing the lower part of the notched glass tube to roll out to an essentially vertical position while restricting the upper part from rolling out, to result in a partially rolled out glass piece;

(IIc) placing the partially rolled out glass piece on a surface; and (IId) allowing the partially rolled out glass piece to roll-out on the surface to form an essentially flat glass plate. Preferably, in step (IId), an external force is imposed on the partially rolled-out glass piece to mechanically assist the roll-out of the glass piece. Preferably, the external force is imposed via a mandrel.

According to one embodiment of the process of the present invention, the glass tube has essentially circular striae when viewed in the direction of the tube center axis, and after step (II), the striae are re-oriented to be essentially parallel to the two major surfaces of the resultant glass plate.

According to one embodiment of the process of the present invention, the glass tube has essentially circular striae when viewed in the direction of the tube center axis, and after step (II), when viewed in the direction of the optical axis of the resultant glass plate, the glass plate is essentially free of striae. In addition, in certain embodiments, when viewed in at least one direction perpendicular to the optical axis of the resultant glass plate, such as in the direction of the center tube axis of the ready-to-flow notched glass tube, the glass plate is essentially free of striae.

In a preferred embodiment of the process of the present invention, in step (II), the temperature elevation rate is between 50-600° C./minute, preferably between 180-600° C./minute between the annealing point of the glass and the highest temperature. Preferably, in step (II), the temperature is held for a period of between 10 minutes to 5 hours, preferably between 10 minutes and 3 hours, at a temperature between the annealing point and the denitrification range of the glass.

A second aspect of the present invention is a process for reforming glass cylinders, comprising the following steps:

(I.0) providing a precursor glass cylinder having a precursor cylinder axis, a length $L_0$ in the direction of the precursor cylinder axis and a precursor cylinder outer diameter $OD_0$;

(I.1) thermally reflowing, with optional pressing, the precursor glass cylinder; and (I.2) optionally drilling in a direction essentially parallel to the precursor cylinder axis to form a cylindrical center cavity, whereby a reformed glass cylinder is formed to have a longitudinal reformed cylinder axis, an outer diameter $OD_1$ and a length $L_1$ in the direction of the reformed cylinder axis, where the reformed cylinder axis is essentially parallel to the precursor glass cylinder axis of the precursor glass cylinder, $L_1 < L_0$, and $OD_1 > OD_0$.

Preferably, in the glass cylinder reforming process of the present invention, $0.3L_0 \leq L_1 \leq 0.8L_0$.

Preferably, in the glass cylinder reforming process of the present invention:

in step (I.0), the precursor glass cylinder comprises an inner glass cane; said inner glass cane is located approximately at the center of the precursor glass cylinder and has a diameter of $ID_0$; and in step (I.2), the inner glass cane is essentially completely removed.

Preferably, in the glass cylinder reforming process of the present invention, in step (I.0), the precursor glass cylinder comprises a mandrel in essentially the central portion. Preferably, the mandrel is maintained in place during step (I.1), and removed after step (I.1). Preferably, the dimension of the mandrel is essentially not changed during step (I.1). The mandrel may be inserted into a glass tube.

Preferably, in the glass cylinder reforming process of the present invention, in step (I.0), the precursor glass cylinder comprises an outside tube having composition and/or properties similar to or differing from those of the glass enclosed in the outside tube. Preferably, this preferred embodiment further comprises the following step (III) after step (II):

(III) removing the surface part of the glass plate resulting from the outside tube. Preferably, in the glass cylinder reforming process of the present invention, after step (I.2), the precursor glass tube has an inner cylindrical cavity with a diameter $ID_1$, and $OD_0 - ID_0 < OD_1 - ID_1$.

Preferably, in the glass cylinder reforming process of the present invention, in step (I.0), the provided precursor glass cylinder has an inner cylindrical cavity the axis of which is parallel to the precursor glass cylinder axis, and the inner cylindrical cavity has a diameter of $ID_0$. Preferably, the ready-to-flow glass tube has an inner cylindrical cavity with a diameter $ID_1$, and $OD_0 - ID_0 < OD_1 - ID_1$.

The present invention process can be applied to thin and thick wall cross-section cylindrical blanks to attain thick photolithography lens blanks. No elaborate fixturing or apparatus is required for glass manipulation in the reshaping process of the present invention. Additionally, no secondary thermal treatments are required for plate straightening. This invention also allows for reorientation of concentric striae and radial compositional gradients, as seen in OVD cylindrical blanks, to favorable orientation to attain the required optical properties.

Surprisingly, the high purity fused silica glass of the present invention, which can be produced by using the reshaping method of the present invention, has a low level of fast axis direction randomness factor in its birefringence pattern.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 3:
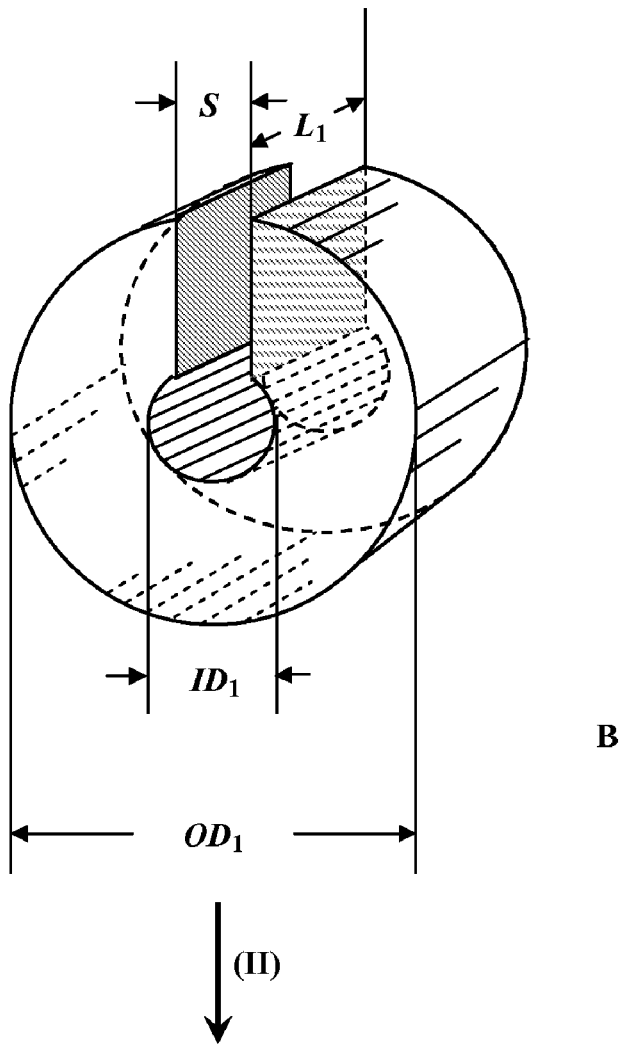
FIG. 3 is a schematic drawing illustrating step (II) of certain embodiments of the process of the present invention, wherein the identified section of the ready-to-flow notched glass tube is reflowed to form a glass plate having two essentially flat major surfaces, a width of a first major surface of $L_3$, a width of a second major surface of $L_4$, and a length of both major surfaces of $L_2$.
Figure 3:
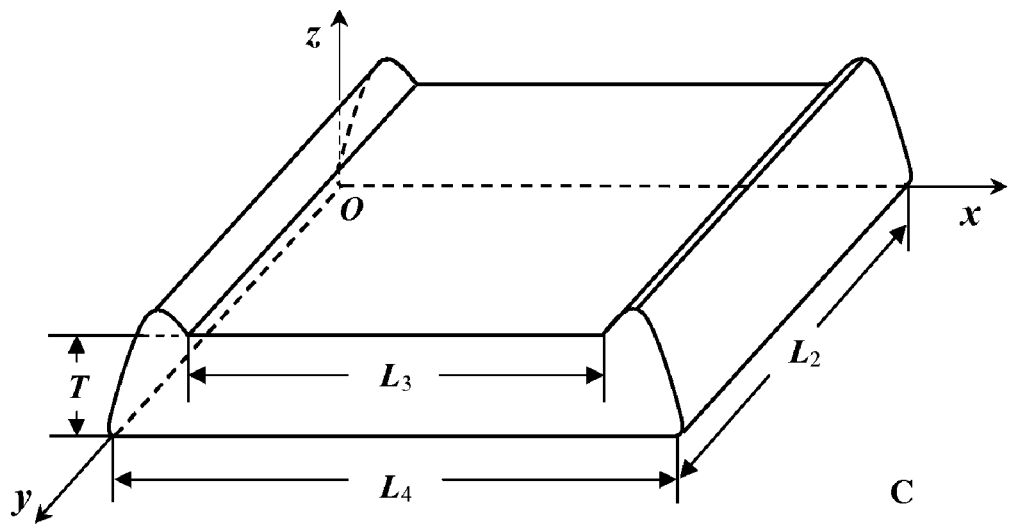

As used herein, the term "variation of refractive index," or "refractive index variation," or "$\Delta n$," means the maximal variation of refractive indices measured in a plane perpendicular to the optical axis of the glass body or glass optical member along a predetermined direction by using interferometry at about 633 nm (He—Ne laser) (with tilt and piston taken out, as indicated infra). As is typically done by one skilled in the art, when discussing refractive index variation along a certain direction, tilt and piston are subtracted. Therefore, the refractive index variation along a certain direction (such as the direction of the x axis or the y axis of the three-dimension orthogonal coordinate system illustrated in FIG. 3) in the meaning of the present application does not include tilt or piston. As indicated below, typically, the optical axis of a glass optical member, a glass blank, or a piece of glass material, is selected to be perpendicular to a plane (a cross-section) in which the measured refractive index inhomogeneity is the smallest, in order to obtain a glass member having large clear aperture area. FIG. 3 in the drawings of the present application schematically illustrates a glass body of the present invention in a xyz orthogonal coordinate system. The glass body has an optical axis z. The plane xOy, perpendicular to axis z, intersects the glass body to obtain a cross-section of the blank. When measuring refractive index homogeneity, the sample taken has a uniform thickness. Preferably, when measured across the cross-section, the variation of refractive index of the glass body of the present invention in the desired direction (such as the x direction as illustrated in FIG. 3), with tilt and piston taken out, is less than 10 ppm, preferably less than 5 ppm, more preferably less than 2 ppm, still more preferably less than 1 ppm, most preferably less than 0.5 ppm. Desirably, the variation of refractive index in both the x and y direction, measured separately, with tilt and piston taken out, is less than 10 ppm, preferably less than 5 ppm, more preferably less than 2 ppm, still more preferably less than 1 ppm, most preferably less than 0.5 ppm.

The birefringence of the glass is measured by a polarimeter at 633 nm (He—Ne laser) in accordance with methods well established in the art, using, for example, commercially available instruments specifically designed for measuring birefringence.

The silica glass as described in the present application may be high purity fused silica glass, undoped or doped at various levels.

As used herein, the term "low LIWFD" means a laser induced wavefront distortion, measured at 633 nm, of between −1.0 and 1.0 nm/cm when subjected to 10 billion pulses of a laser operating at approximately 193 nm having at a fluence of approximately 70 $\mu J \cdot cm^{-2} \cdot pulse^{-1}$ and a pulse length of about 25 ns.

The process of the present invention is advantageous for making high purity fused silica glass plate from silica glass tubes having circular striae in cross-sections thereof perpendicular to the tube center axis. However, the process of the present invention is not limited to fused silica glass tubes. It may be adapted for reflowing other glass tubes as well. Furthermore, glass tubes without striae in the tube cross-section, or with non-circular striae may be reflowed using the process of the present invention as well. That said, the present invention process is particularly advantageous for thermal reflow of silica glass tube having circular striae to produce glass plates essentially free of observable striae at least in a plane perpendicular to its optical axis.

Step (I) of the process of the present invention involves providing a ready-to-flow notched glass tube having (a) a longitudinal tube center axis, (b) an identified section between two cross-sections perpendicular to the tube center axis having a section length $L_1$; and (c) a notch in the direction of the tube center axis of the ready-to-flow notched glass tube through the tube wall. The ready-to-flow notched glass tube may be provided and produced as such, or produced from a precursor glass tube without a notch.

In an embodiment of the latter case, step (I) comprises the following steps:

(Ia) providing a precursor glass tube having (a) a longitudinal tube axis, and (b) an identified section between two cross-sections perpendicular to the tube axis having a longitudinal section length $L_1$; and (Ib) forming a notch in the direction of the tube axis of the precursor glass tube through the tube wall, whereby the ready-to-flow notched glass tube is formed.

The precursor glass tube concerned in the present application preferably takes the shape of a cylinder having a longitudinal cavity therein. The ready-to-flow notched glass tube concerned in the present application preferably takes the shape of a part of a cylinder having a longitudinal cavity and a longitudinal notch. The longitudinal tube axis and/or the longitudinal center axis as discussed in the present application are typically, but not limited to, the longitudinal axis of the outer cylindrical surface of the tube, if the tube has a cylindrical outer surface. The longitudinal cavity within the tube is preferably cylindrical as well. It is desired that the cylindrical cavity and the outer cylindrical surface are concentric. However, as indicated in the general description supra and the detailed description of the invention infra, they may be eccentric as well.

The precursor glass tube and the ready-to-flow notched glass tube may be produced by conventional tube-making process, such as drawing, drilling of a glass rod, and the like. Drawing may be advantageously used for glasses with a relatively low softening temperature, such as normal soda-lime glasses, borosilicate glasses, and the like. For glasses having a high softening temperature, such as fused silica glass, drawing may be impractical, in which cases drilling may be advantageously used.

In the case of silica glass, particularly high purity synthetic silica glass, and other high purity glass, the glass may be produced by known vapor deposition processes, such as outside vapor deposition ("OVD"), inside vapor deposition ("IVD"), vertical axial deposition ("VAD") from inorganic silicon precursor compounds, such as silicon halides, and/or organosilicon precursor compounds, such as octamethylcyclotetrasiloxane ("OMCTS"), and the like. The glass may be doped or undoped. These processes may be plasma assisted as is known in the art. OVD, IVD and VAD are typically soot-to-glass processes in which soot preforms are first formed by silica soot particles generated by flame hydrolysis of the precursor compounds, which are in turn consolidated to form transparent fused silica glass.

In the case of OVD, silica soot preforms are formed on the outside surface of an axially rotating mandrel, which can be a solid core cane, a tube, and the like, made of silica glass or other materials. The soot preforms may be consolidated prior to the removal of the mandrel or thereafter. If the consolidation is performed prior to the removal of the mandrel, the consolidated silica glass generally has a different composition from that of the mandrel. Thus the mandrel needs to be removed—usually by drilling, and the like—to result in a glass tube that can be used as the precursor glass tube in the process of the present invention. If the consolidation is performed after the removal of the mandrel, the consolidated glass directly forms a fused silica glass tube. These glass tubes, either formed from removing mandrel from consolidated glass, or from consolidating hollow soot preform with mandrel previously removed, may be used directly as the precursor glass tube in the process of the present invention. Alternatively, in certain situations, as described infra, it may be desirable to further process (such as reflow) the as-consolidated glass with mandrel remaining in the center before drilling to remove the mandrel, or the glass tube with mandrel removed, or the glass tube with a mandrel inserted therein, before the glass tubes are used as the precursor glass tube in the process of the present invention. Still alternatively, where a glass tube is used as the mandrel, the soot preform may be consolidated without removing the mandrel. The thus formed glass tube with the inner mandrel tube can be used as the precursor glass tube directly, optionally reflowed, cut to form the notch, then thermally reflowed to form the glass plate according to the process of the present invention. The glass tube mandrel thus forms at least a part of the surface part of the glass plate produced. The glass plate can then be ground to remove that surface part to result in a glass plate having essentially homogeneous composition and property.

In the case of IVD, silica soot preforms are formed on the inner surface of an axially rotating tube, which can be made of silica glass or other materials. The soot preforms may be consolidated prior to the removal of the outside tube or thereafter. If the consolidation is performed prior to the removal of the tube, the consolidated silica glass generally has a different composition from that of the outside tube. Thus the outside tube can be removed after consolidation, with or without further processing (such as further thermal reflow such as, e.g., the Squash Process described infra) to form the ready-to-flow silica glass tube of the present invention. Alternatively, the outside tube is retained after consolidation, during the formation of the precursor glass tube, during the formation of the notch and during the thermal reflow of the notched glass tube. Thus after the thermal reflow process of the present invention, the outside tube forms the surface part of the glass plate produced. The glass plate can then be ground to remove the surface part to result in a glass plate having essentially homogeneous composition and property. If the consolidation of the soot preform is performed after the removal of the outside tube, the consolidated glass forms a fused silica glass tube having an essentially uniform composition. The thus obtained glass tubes may be used directly as the precursor glass tube in the process of the present invention to form a notch thereon. Alternatively, in certain situations, as described infra, it may be desirable to further process (such as reflow by, e.g., the Squash Process described below) the as-consolidated tube before it is used as the ready-to-flow notched glass tube in the process of the present invention.

The VAD silica glass may be processed to form the ready-to-flow silica glass tube according to the processes described above in connection with OVD and IVD *mutatis mutandis*.

It has been found that for synthetic silica glass made by the VAD, OVD and IVD processes, due to variations in the process conditions during soot deposition, variation in composition in different layers of the soot preform can occur. Such composition variation, typically largely circular, can lead to striae upon consolidation. For the purpose of the present invention, "striae" mean variations in the bulk in the consolidated glass in composition and/or physical properties (particularly refractive index) with magnitudes that are detrimental to the performance of the glass for its intended purpose. In a given area of a given plane, striae may appear in a repeated pattern at certain frequency, or may occur sporadically. Striae, especially those in the form of refractive index variation, are highly undesirable, particularly if present in a plane perpendicular to the optical axis of an optical member. As described supra, visible striae in planes perpendicular to the optical axis may be present, if glass plates are formed directly from pressing the cylindrical silica glass tubes having circular striae in its cross-sections perpendicular to the tube axis.

The vapor deposition processes mentioned above were previously used in the art in producing optical waveguide preforms. Thus preforms typically have a relatively long length and small diameter. Thus silica glass tubes directly made from these waveguide preforms (such as by removing the mandrel) tend to have a relatively long length and small tube wall thickness. As mentioned supra, these slim tubes made from the as-consolidated silica glass may be directly used as the precursor glass tubes in the process of the present application. However, for a plurality of end applications of the silica glass, the resulting reflowed glass plate would not have sufficient width or thickness. For example, the production of optical blanks for regular photomask substrates and/or lens elements used in modern photolithography operating at about 248 and 193 nm by using the thermal reflow process of the present invention requires the ready-to-flow notched glass tube have a thicker tube wall and larger tube outer diameter.

The present inventors have devised a method by which slim fused silica cylinders or tubes of the dimension of optical waveguide preforms can be formed into silica glass tubes having higher tube wall thickness and larger tube outer diameter suitable for the production of optical blanks for use as regular photomask and optical element in deep UV and vacuum UV photolithography. This method is referred to as the "Squash Process" hereinafter. In general terms, the Squash Process comprises, in step (Ia) of the process of the present invention mentioned above, the following steps:

(I0) providing a precursor glass cylinder having a precursor cylinder axis, a length $L_0$ in the direction of the precursor cylinder axis and a precursor cylinder outer diameter $OD_0$;

(I1) thermally reflowing, with optional pressing, the precursor glass cylinder; and (I2) optionally drilling in a direction essentially parallel to the precursor cylinder axis to form a cylindrical inner cavity, whereby the precursor glass tube is formed to have a longitudinal tube axis, an outer diameter $OD_1$ and a length $L_1$ in the direction of the tube axis. It is preferred the tube axis is essentially parallel to or the same as the precursor cylinder axis of the precursor glass cylinder, $L_1 < L_0$, and $OD_1 > OD_0$.

In the preferred embodiment of the Squash Process, $0.3L_0 \leq L_1 \leq 0.8L_0$. Thus as a result of the Squash Process, the length of the glass cylinder is reduced.

In the Squash Process, it is preferred that:

in step (I0), the precursor glass cylinder comprises an inner glass cane having the same or differing composition and/or properties than the glass surrounding the inner glass cane; said inner glass cane is located approximately at the center of the precursor glass cylinder and has a diameter of $ID_0$;

in step (I2), the inner glass cane is essentially completely removed.

In this preferred embodiment of the Squash Process, it is further preferred that after step (I2), the precursor glass tube has an inner cylindrical cavity with a diameter $ID_1$, and $OD_0 - ID_0 < OD_1 - ID_1$. Thus the wall thickness of the precursor glass tube is higher than that of the precursor glass cylinder if the inner glass cane had been removed from the precursor glass cylinder.

In another embodiment of the Squash Process, in step (I0), the provided precursor glass cylinder has an inner cylindrical cavity the axis of which is parallel to the precursor cylinder axis, and the inner cylindrical cavity has a diameter of $ID_0$. Preferably, the inner cylindrical cavity has a diameter $ID_1$, and $OD_0 - ID_0 < OD_1 - ID_1$. Thus the wall thickness of the resulting precursor glass tube is higher than that of the precursor glass cylinder (which is actually a slimmer tube).

It has been found that in order to produce glass plates having a larger thickness, usually higher thickness of the tube wall of the ready-to-flow notched glass tube is desired.

Figure 1A:
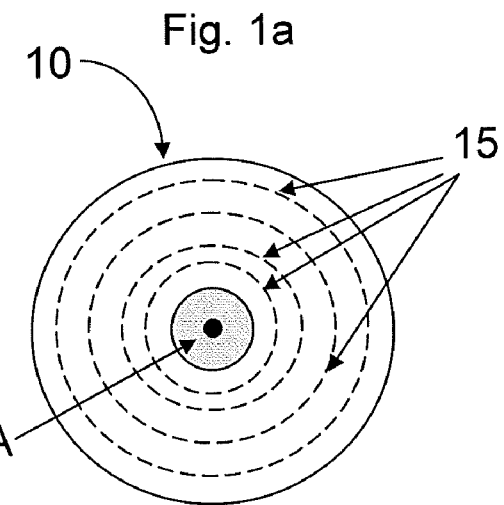
FIG. 1 is a schematic drawing illustrating steps (I0), (I1) and (I2) of certain embodiments of the process of the present invention, wherein a precursor glass tube is formed.
Figure 1B:
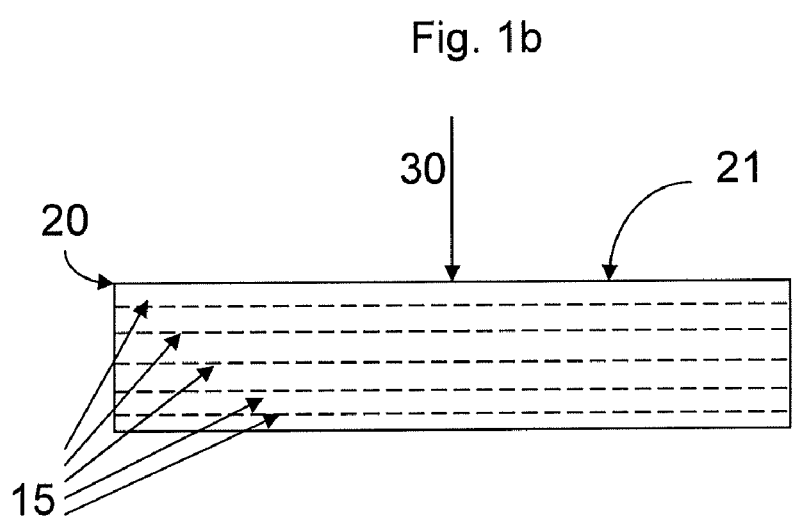

FIG. 1 schematically illustrates the steps of an embodiment of the Squash Process according to the present invention. In this figure, a precursor glass cylinder A2 is provided in step (I0) from a cylinder A1. The precursor glass cylinder has an outer diameter $OD_0$, a precursor longitudinal cylinder axis and a length $L_0$ in the direction of the cylinder axis. In addition, the precursor glass cylinder A2 has an inner cavity or core cane having the shape of a cylinder with an inner diameter of $ID_0$. In this figure, it is shown that the precursor glass cylinder A2 are concentric with the core cane or inner cavity. In practice, they may be eccentric. In step (I1), the precursor glass cylinder is reflowed to form a new cylinder having a shorter length $L_1$ and a larger outer diameter $OD_1$. During the reflow process, the inner cavity or the core cane is deformed. Thus in step (I2), the core cane is essentially completely drilled out, or the inner cavity is further drilled to redress the deformation thereof, such that a new inner cylindrical cavity having a diameter of $OD_1$ is formed. Alternatively, if A2 has an inner cavity instead of a core cane, a deformable or non-deformable mandrel (made of silica, graphite, or other materials) may be inserted into the inner cavity during step (I1), such that at the end of (I1), the mandrel can be removed, with or without the additional step (I2), to result in the precursor glass tube. The outer cylindrical surface having a diameter $OD_1$ and the inner cylindrical surface having a diameter $ID_1$ together with the two end cross-sectional surfaces define the precursor glass tube A as provided in step (I) of the process of the present invention. As is obvious from the figure, because $L_1 < L_0$, the wall thickness of the precursor glass tube A is larger than that of the precursor glass cylinder A2.

Figure 10:
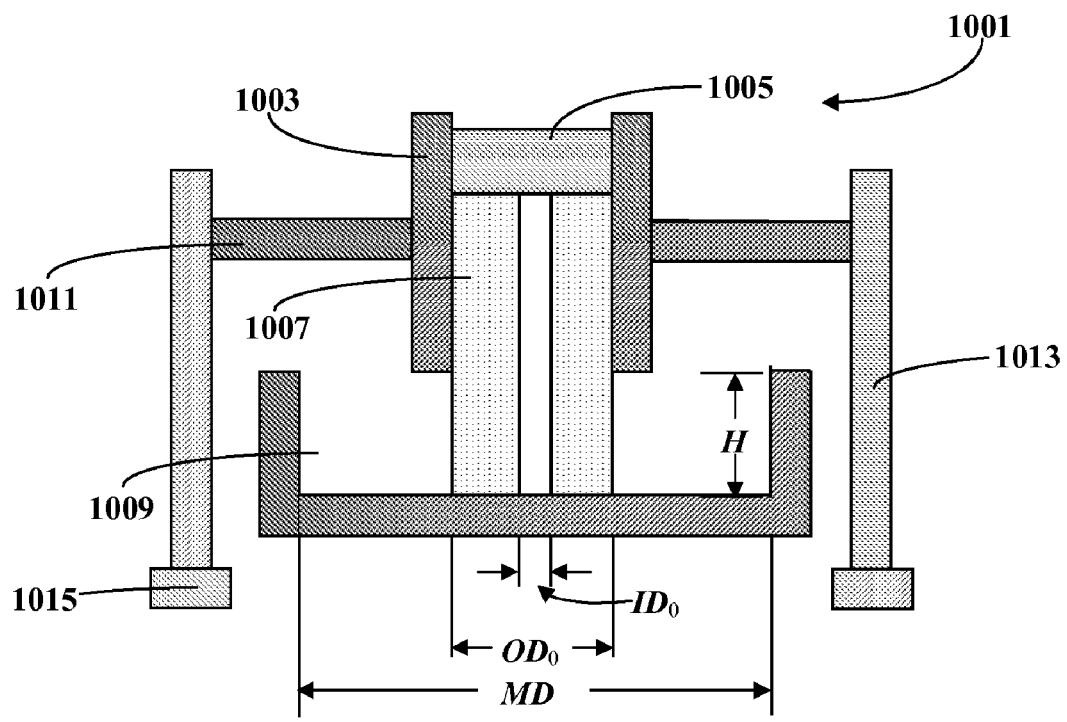
FIG. 10 is a schematic drawing illustrating a device in which a glass cylinder is longitudinally reflowed under weight to a cylinder having shorter length at an elevated temperature.

FIG. 10 schematically illustrates the cross-sectional view of a furnace device in which step (I1) of the Squash Process can be implemented. In this figure, the device 1001 comprises an outer barrel 1013 in which a crucible 1009, and a sleeve 1003 are placed. The sleeve is connected to the outer barrel 1013 via supporting arms 1011. The outer barrel 1013 is supported on ringwall 1015. Both the sleeve and the crucible are made of refractory materials, such as purified graphite. The crucible has a depth of H, and an inner diameter of MD. The precursor glass cylinder 1007 having an outer diameter of $OD_0$ and a length $L_0$ is first placed on the bottom plate of the crucible 1009 and partly inside the sleeve 1003. In this figure it is also shown the optional weight 1005 placed atop the precursor glass cylinder 1007. The furnace is then heated to a reflow temperature, such as above the softening point of the glass, where the glass reflows under the influence of its own gravity and pressed by the weight 1005. The sleeve 1003 guides the reflow of the glass. At the end of the reflow process, a glass cylinder having an outer diameter $OD_1$ and a length $L_1$ is obtained, where $OD_0 < OD_1 \leq MD$, and $L_0 < L_1 \leq H$. The thus formed new cylinder typically has a center axis of the precursor glass cylinder because of the use of the guiding sleeve 1003. In addition, if the precursor glass cylinder has essentially circular striae in cross-sections perpendicular to the center axis of the precursor glass cylinder 1007, after the thermal reflow, in the new glass cylinder, the striae will be maintained largely in circular shape in cross-sections perpendicular to the center axis of the new cylinder.

By virtue of the Squash Process, glass plate with larger width and higher thickness may be produced from slim glass tubes and rods.

In step (Ib) of the process of the present invention, a notch is cut in the precursor glass tube in the direction of, preferably parallel to, the longitudinal tube center axis of the precursor glass tube through the tube wall.

Figure 4:
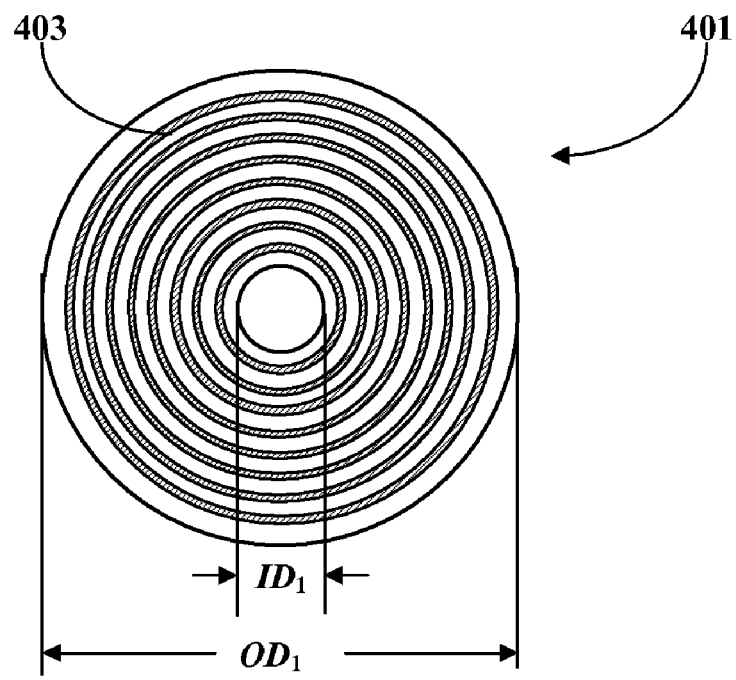
FIG. 4 is a schematic drawing illustrating the cross-section of an embodiment of a precursor glass tube cut by a plane perpendicular to the longitudinal center tube axis before notch formation having circular striae in the cross-section.
Figure 5:
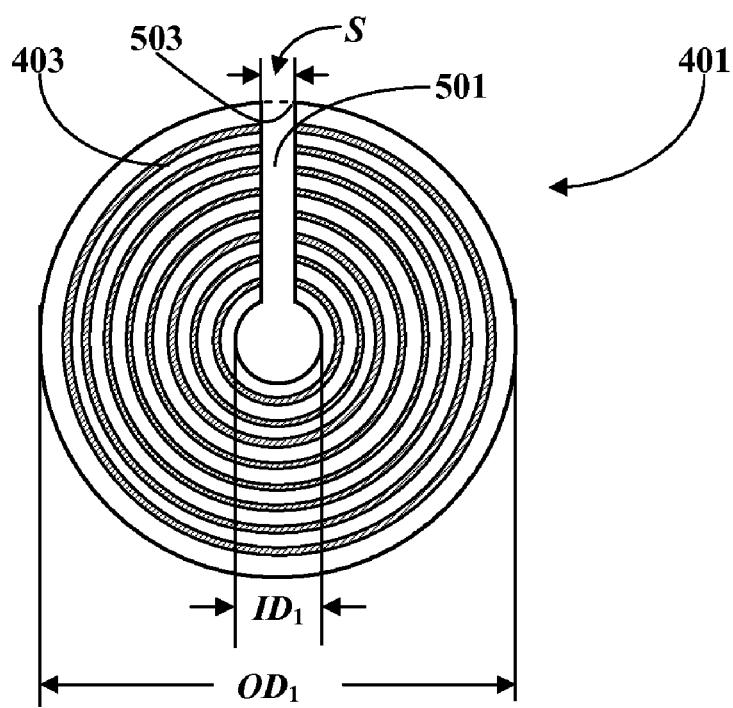
FIG. 5 is a schematic drawing illustrating the cross-section of the embodiment of a ready-to-flow notched glass tube corresponding to the precursor glass tube of FIG. 4 after notch-formation, wherein the notch has essentially a rectangular cross-section when cut by a plane perpendicular to the longitudinal center axis of the glass tube, and the rectangular cross-section has a width less than the inner diameter of the glass tube.
Figure 6:
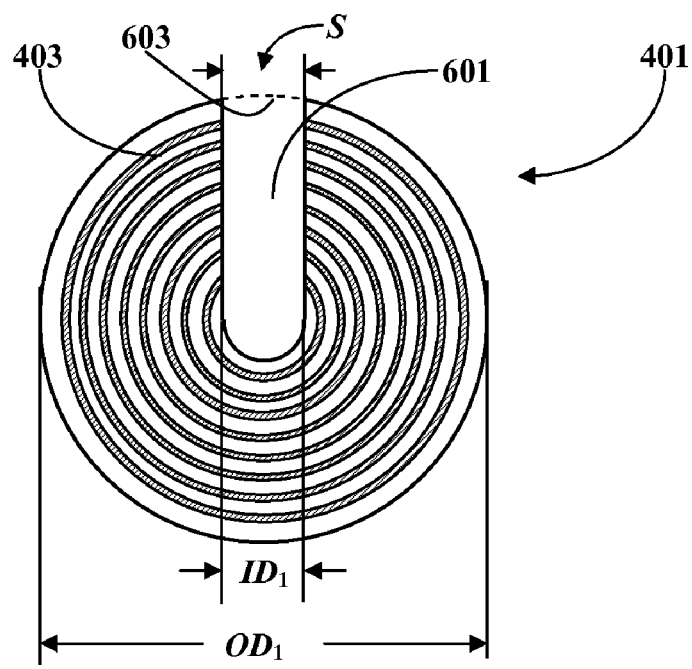
FIG. 6 is a schematic drawing illustrating the cross-section of the embodiment of a ready-to-flow notched glass tube corresponding to the precursor glass tube of FIG. 4 after notch-formation, wherein the notch has essentially a rectangular cross-section when cut by a plane perpendicular to the longitudinal center axis of the glass tube, and the rectangular cross-section has a width substantially equal to the inner diameter of the glass tube.
Figure 7:
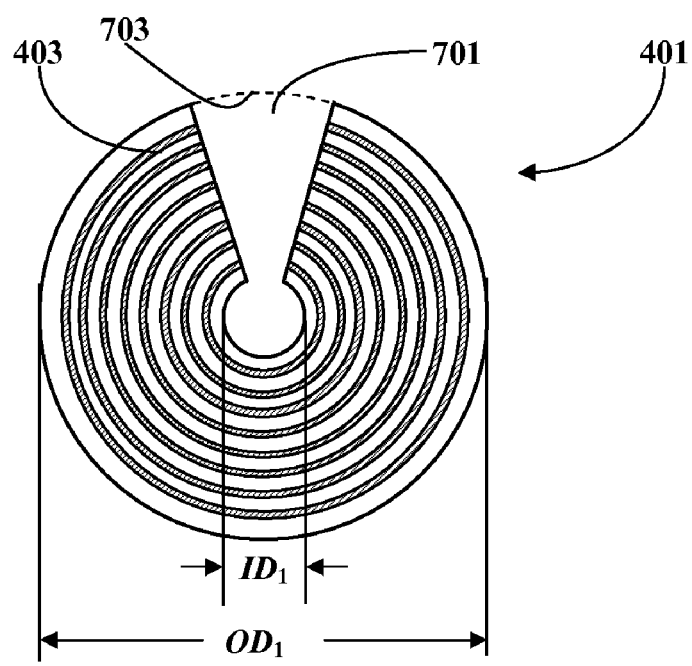
FIG. 7 is a schematic drawing illustrating the cross-section of the embodiment of a ready-to-flow notched glass tube corresponding to the precursor glass tube of FIG. 4 after notch-formation, wherein the notch has essentially a truncated V-shaped (trapezoidal) cross-section when cut by a plane perpendicular to the longitudinal center axis of the glass tube, and the shorter base line of the trapezoidal cross-section has a width less than the inner diameter of the glass tube.
Figure 8:
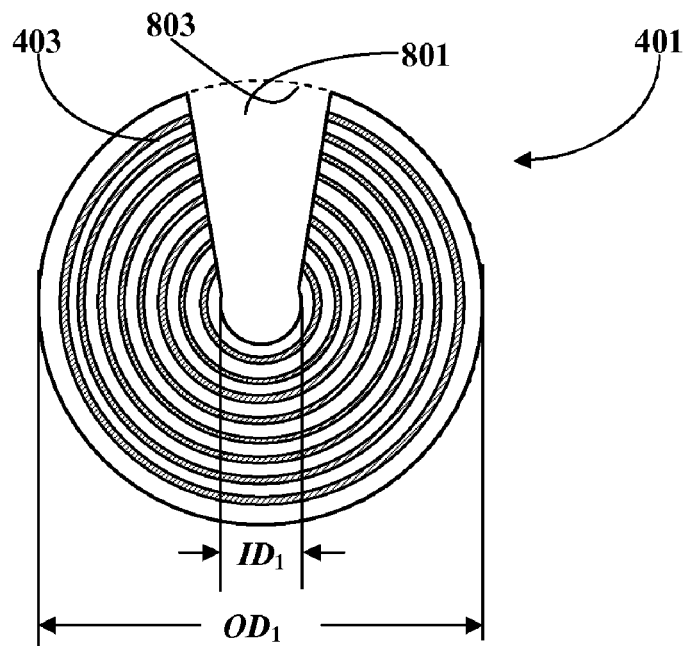
FIG. 8 is a schematic drawing illustrating the cross-section of the embodiment of a ready-to-flow notched glass tube corresponding to the precursor glass tube of FIG. 4 after notch-formation, wherein the notch has essentially a trapezoidal cross-section when cut by a plane perpendicular to the longitudinal center axis of the glass tube similar to that of FIG. 7, but the shorter base line of the trapezoidal cross-section in this figure is longer than that in FIG. 7.

FIG. 4 illustrates the cross-section 401 of the precursor glass tube according to an embodiment of the process of the present invention. The precursor glass tube in this figure has an outer diameter $ID_1$, an inner cavity having a diameter $ID_1$, and a plurality of circular striae 403. FIGS. 5, 6, 7 and 8 illustrate the geometries of various notches that can be formed into the precursor glass tube of FIG. 4. FIG. 5 shows a notch 501 having an essentially rectangular cross-section with a width $S < ID_1$. Thus the notch and the inner cavity together form a key-hole geometry. FIG. 6 shows a notch 601 having an essentially rectangular cross-section with a width $S \approx ID_1$. FIG. 7 shows a trapezoidal (truncated V-shaped) notch 701 having a short base $< ID_1$. FIG. 8 shows another trapezoidal notch 801 with a short base approximating $ID_1$. As indicated by the dotted curve lines, the cross-sections of all the notches in these figures have an outer arc (503, 603, 703 and 803 in FIGS. 5, 6, 7 and 8, respectively) with a length of $L_{arc}$. All these notches can be produced and used in the process of the present invention.

Preferably, the notch formed in the wall of the ready-to-flow notched glass tube has a center plane passing through the longitudinal tube center axis of the ready-to-flow notched glass tube, and the two sides of the notch beside the center plane are essentially symmetric. In such scenario, if the outer cylinder and the center cylindrical cavity of the ready-to-flow notched glass tube are concentric, the notch may be formed at any location of the circumference of the tube wall; if the outer cylinder and the center cylindrical cavity of the ready-to-flow notched glass tube are eccentric, the notch is preferably formed at the location where the center plane of the notch passes the maximal or minimal thickness, preferably the minimal thickness, of the precursor glass tube. Thus, it is preferable that the two sides of the notched ready-to-flow notched glass tube about the center plane of the notch are symmetric.

Figure 2:
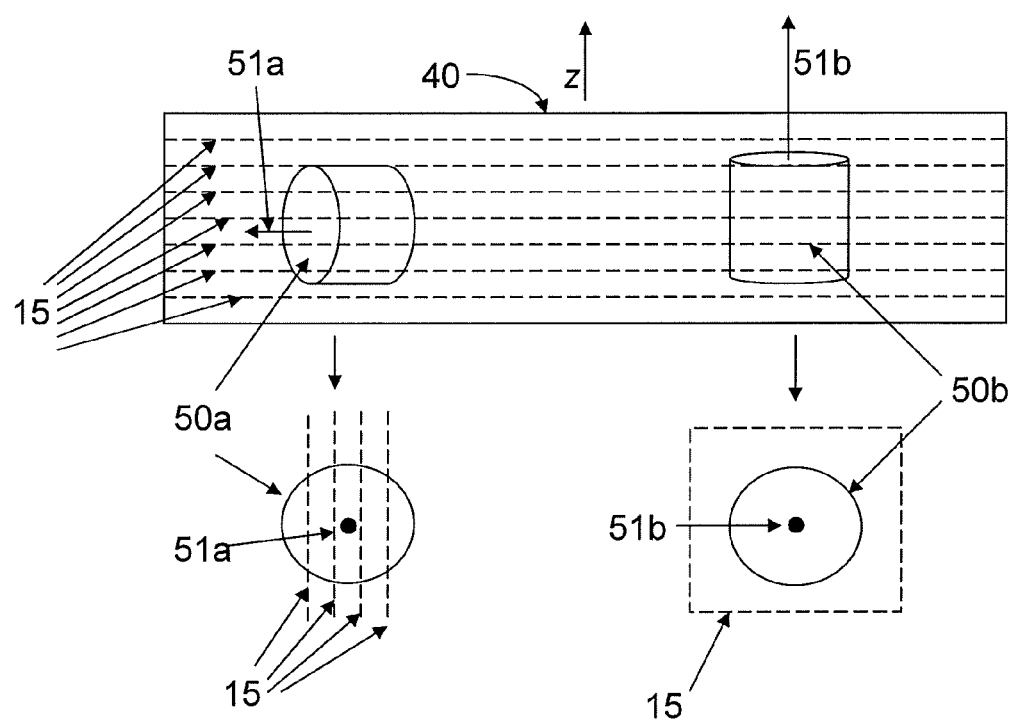
FIG. 2 is a schematic drawing illustrating step (Ib) of certain embodiments of the process of the present invention, wherein a notch is formed in the precursor glass tube to produce the ready-to-flow notched glass tube.

FIG. 2 schematically illustrates the notch-formation step according to the process of the present invention. The notch illustrated in this figure corresponds to that of FIG. 5, where the width of the notch is S, and $S < ID_1$.

The notch can be formed by various methods and equipment known in the art, such as by using wire saw, water jet, band saw, and the like. Preferably, after cutting the notch, the notched glass tube is thoroughly cleaned before performing step (III) of the preset invention. Such cleaning may include acid (HCl, HF, and the like) washing, solvent washing, $Cl_2$ treatment at high temperature, and the like, so that contamination introduced by the cutting process is eliminated or minimized.

Step (II) of the process of the present invention comprises thermally reflowing the ready-to-flow notched tube thus provided in step (I) at an elevated temperature such that the notched tube reflows to form a glass plate. The formed glass plate preferably has two major surfaces and an optical axis essentially perpendicular to the two major surfaces. Generally this step is conducted with the notched side and the notch facing upwards and the un-notched side placed on the surface of a support, such as the bottom plate of a crucible. It is preferred that the notch is placed in an essentially vertical position.

This thermal reflow step (III) is advantageously performed at above the softening point of the glass. For fused silica glass whose softening temperature is about 1650° C., this step is usually carried out at above 1700° C., but below 2000° C., preferably below 1900° C.

If high purity of the glass and a low metal contamination are required for the glass, which is the case for high purity synthetic silica glass for use in deep UV and vacuum UV lithography, it is desired that the step (II) is performed in a purifying atmosphere comprising a cleansing gas. The cleansing gas may be, for example, a halogen, a halogen-containing compound and compatible mixtures thereof. Such halogen-containing compound may be selected from HX, $C_aS_bX_c$ and compatible mixtures thereof, where X is selected from F, Cl and Br, a, b and c are non-negative integers meeting the valency requirements of the individual elements.

FIG. 3 schematically illustrates step (II) of an embodiment of the process according to the present invention. In this figure, the ready-to-flow notched glass tube B is reflowed and extended sideways to form a glass plate C. The plate C is placed in a three-dimensional orthogonal coordinate system xOyz. The resultant glass plate C has two essentially flat major surfaces: a smaller upper surface with a width $L_3$ (shown above plane xOy) and a larger lower surface with a width $L_4$ (shown in plane xOy). Both surfaces have a length of $L_2$. The axis z is the optical axis of the glass plate. The larger surface having an area $L_2 \cdot L_4$ essentially corresponds to the outer cylindrical surface of the ready-to-flow notched glass tube B, and the smaller surface having an area $L_2 \cdot L_3$ essentially corresponds to the inner cylindrical surface of the ready-to-flow notched glass tube B. The thickness T of the resultant glass plate C corresponds to the wall thickness 0.5 $(OD_1 - ID_1)$ of the ready-to-flow notched glass tube B. The plate having dimension of $L_2 \cdot L_3 \cdot T$ represents the useable plate that can be extracted from the reflowed glass body. Typically, $T < 0.5 (OD_1 - ID_1)$. Typically, $L_3 > \pi \cdot ID_1$, which means that the inner cylindrical cavity surface is stretched during the reflow process. FIG. 3 shows the edge portion of the reflowed glass plate as having a part protruding upwards. In practice, the edges may have a different configuration, depending on the shape and dimension of the ready-to-flow notched glass tube, the notch, the reflow temperature and time.

Figure 9:
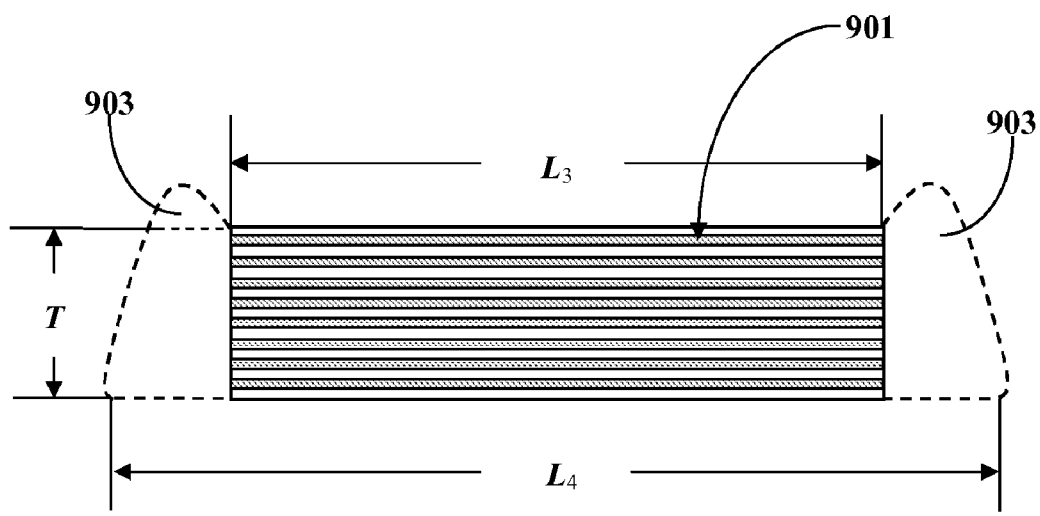
FIG. 9 is a schematic drawing illustrating the cross-section of a glass body extracted from the glass plate showed in FIG. 3, cut by a plane perpendicular to the center axis of the ready-to-flow notched glass tube. The glass body has a plurality of striae essentially parallel to each other in the cross-section.

If the ready-to-flow notched glass tube has essentially circular striae such as those illustrated in FIG. 4, in step (II), such striae are normally reoriented, extended and maybe twisted slightly. FIG. 9 schematically illustrates the cross-section of a useable glass plate extracted from the plate showed in FIG. 3. This figure shows the remnant striae 901 in the plate when viewed from the direction of axis y of the plate in FIG. 3, which are essentially parallel to each other, but extend in directions essentially perpendicular to the optical axis z. Thus the circular striae of the ready-to-flow notched glass tube is reflowed and reoriented in the glass plate. The overall result is, when viewed in the direction of the optical axis of the resultant glass plate (axis z), essentially no striae is observable. Surprisingly, it has also been found that in certain preferred embodiments, even if the starting glass tube has circular striae as illustrated in FIG. 4, the resultant glass plate may still be devoid of striae when viewed at least in one direction perpendicular to the optical axis of the plate. It is hypothesized by the present inventors that, in practice, the reoriented striae may not be strictly parallel to each other. However, because the tube walls are stretched during the thermal reflow of the present invention, the dimensions of the striae are reduced. Moreover, the final striae in the glass plate may curve and twist slightly, leading to mutual cancellation of distortion caused by each other. Thus, the overall effect is reduced striae in the resultant plate and improved optical performance at least in the direction of the optical axis.

As a result of step (II), usually $L_1 \leq L_2 \leq 2L_1$, preferably $L_1 \leq L_2 \leq 1.5L_1$, more preferably $L_1 \leq L_2 \leq 1.2L_1$. Thus, at the end of the thermal reflow process of the present invention, the length of the ready-to-flow notched glass tube has been extended. However, it is preferred that the length is not significantly extended, especially where a high thickness of the final glass plate is desired. As discussed infra, where the thermal reflow of the present invention is performed without additional external mechanical assistance, the reflow is essentially the result of the influence of the tube gravity on the notched glass tube. Even if mechanical assistance is adopted, it is generally preferred that the overall effect of the mechanical assistance is similar to the effect of the gravity. It is generally preferred that the thermal reflow temperature is not overly high such that the viscosity of the glass becomes so low that the glass flows freely in all directions. Rather, it is preferred that the reflow temperature is controlled such that the movement of the notched glass tube is mostly limited to sideways roll-out during a desired roll-out time period. Hence the preference that $L_1 \leq L_2 \leq 1.5L_1$, more preferably $L_1 \leq L_2 \leq 1.2L_1$.

According to the process of the preset invention, it is preferred that in the resultant glass plate, $L_3 \leq 0.5 \cdot L_4$, preferably $L_3 \geq 0.8L_4$, more preferably $L_3 \geq 0.9L_4$, still more preferably $L_3 \geq 0.95L_4$. As indicated supra, the plate having dimension $L_2 \cdot L_3 \cdot T$ represents the useable part for the intended purpose that can be produced from the reflowed glass plate at the end of step (II) of the process of the present invention corresponding to the identified section of the ready-to-flow notched glass tube provided in step (I) as mentioned above. This would allow a higher yield of the final useable glass. Typically, the edge portions (illustrated as enclosed by the dotted edge line and the side line of the useable rectangular plate, 903 in FIG. 9) of the reflowed glass plate tend to have less compositional and/or property homogeneity than those in the flat useable part at least when viewed in the direction of the optical axis of the plate. Thus they may need to be sacrificed when extracting the useable part from the reflowed glass.

In a preferred embodiment of the process of the present invention, the ready-to-flow notched glass tube and its inner cavity are both cylindrical and have a diameter of $OD_1$ and $ID_1$, respectively, and in step (II), the identified section of the ready-to-flow notched glass tube is formed into a glass plate having two essentially flat major surfaces, a width of a first major flat surface of $L_3$, a width of a second major surface of $L_4$, $L_4 \geq L_3$, a length of both major surfaces of $L_2$, and a thickness between the two essentially flat major surfaces of T. It is preferred in this embodiment that $\pi \cdot OD_1 - L_{arc} \leq L_4 \leq 2 (\pi \cdot OD_1 - L_{arc})$, preferably $\pi \cdot OD_1 - L_{arc} \leq L_4 \leq 1.8(\pi \cdot OD_1 - L_{arc})$, more preferably $\pi \cdot OD_1 - L_{arc} \leq L_4 \leq 1.5(\pi \cdot OD_1 - L_{arc})$, where $L_{arc}$ is the length of the outer arc of the cross-section of the notch formed on the tube wall. Thus the outer cylindrical surface of the ready-to-flow notched glass tube is preferably stretched to a desired level during the reflow process. Typically, in order to obtain a thicker glass plate, it is desired that the ratio of $L_4/(\pi \cdot OD_1 - L_{arc})$ is closer to 1. As mentioned above, during the thermal reflow process of the present invention, the inner cavity surface is stretched. Usually, the smaller the ratio of the diameter of the inner cavity to the diameter of the outer cylinder, $ID_1/OD_1$, the higher the extent to which the inner cavity surface is stretched. Nonetheless, to obtain a glass plate with larger area, it is preferred that $L_3 \geq 1.5\pi \cdot ID_1$, more preferably $L_3 \geq 2\pi \cdot ID_1$, still more preferably $L_3 \geq 3\pi \cdot ID_1$. Further, as discussed supra, because of the stretch, the thickness of the resultant glass plate in step (II), T, tends to be smaller than the wall thickness of the ready-to-flow notched glass tube in the process of the present invention. Nonetheless, it is preferred that $0.1 \cdot (OD_1 - ID_1) \leq T \leq 0.45 \cdot (OD_1 - ID_1)$, more preferably $0.10 \cdot (OD_1 - ID_1) \leq T \leq 0.40 \cdot (OD_1 - ID_1)$, and still more preferably $0.10 \cdot (OD_1 - ID_1) \leq T \leq 0.30 \cdot (OD_1 - ID_1)$.

Crucibles made of purified graphite are preferred for step (II) if fused silica glass is the material of the ready-to-flow notched glass tube. Purified porous ceramic felt liner may be used in conjunction. The ceramic felt liner can be fibrous Zirconia felt (such as ZYF-100 manufactured by Zircar of Florida N.Y.). The use of the ceramic felt inhibits reaction between the glass and graphite at high processing temperatures. This material is seen to be non-reactive and non-wetting with fused silica as well as allowing for escape of gaseous species through the felt. The latter feature avoids entrainment of gases into the glass during reflow and roll-out. Alternative crucible and liner materials can be employed depending on furnace environment and degree to which it may react with and be wetted by fused silica glass. Coating of crucible and liner materials can be employed to minimize the reaction with fused silica glass as well as potential for contamination of the glass. Materials identified to date include refractory metals such as molybdenum and tungsten, ceramics including stabilized zirconia, zirconium silicate (Zircon), silicon carbide, alumina, and crucible/liner coating materials such as boron nitride, yttrium oxide, and carbon. It should be noted that the use of a rigid liner or substrate material in contact with the glass during roll out will also improve the resultant blank homogeneity versus that attained using the compliant zirconia felt liner. Special wall design may be employed as well.

Once positioned in the crucible and loaded into the furnace the glass is heated to reflow/roll-out temperature to induce softening and stretching of the glass (i.e., roll-out). For silica glass, the maximum furnace temperature is on the order of 1700° C. to 1900° C. Current experimental results indicate that it is desired to raise the furnace temperature to about 1800° C. to 1850° C. with hold times of up to 1 hour for fused silica glass with nominal β-OH concentrations up to 500 ppm by weight. Experimentation to date has shown heating rates of 50° C./hour to 600° C./hour above the glass anneal point to the maximum temperature useful for roll out. Higher ramp rates (e.g., 180° C./hour to 600° C./hour) are seen to be more effective in stretching the center portion of the glass during roll out. At temperatures between the anneal point and glass denitrification range a hold at temperature can be employed to yield more uniform temperature through the glass blank. Present results were attained using graphite resistively heated furnaces with inert gas atmospheres of helium or argon employed during thermal treatment. Pressures of ~1 to 3 psi (~6.89×10³ to 2.07×10⁴ Pa) above atmospheric pressure were maintained during the thermal cycle. The roll-out process is not seen to be restricted the above type of furnace design or environment. Alternative furnace types and atmospheres can be employed for this process so long as materials used for crucible and liner materials are compatible with glass, furnace materials and environment.

The roll out process has been seen to be effective for silica glass blanks with wall thicknesses between 1" to 2.5" (2.5 to 6.3 cm) experimentally. Modeling analysis indicates that notched blanks with both thinner and thicker wall thickness can be rolled out. The roll process has also been seen to be scalable in experimental trials for blank lengths between 4" to 10" (10 to 25 cm). No limit seen is presently for the maximum length roll out possible other than furnace size restrictions.

A study of the impact of roll out on index homogeneity was conducted for a sample. This sample was a key-holed notched blank having a key hole geometry illustrated in FIG. 5 (30 mm $ID_1$, 10 mm slot and ~45 mm wall thickness). Index homogeneity measurements in a plane perpendicular to the optical axis, post grind and anneal indicates a $\Delta n$ of <3 ppm over a 127 mm clear aperture at a final ground blank thickness of 31.8 mm. Additionally, no micro-striae were observed in the same plane.

Figure 11:
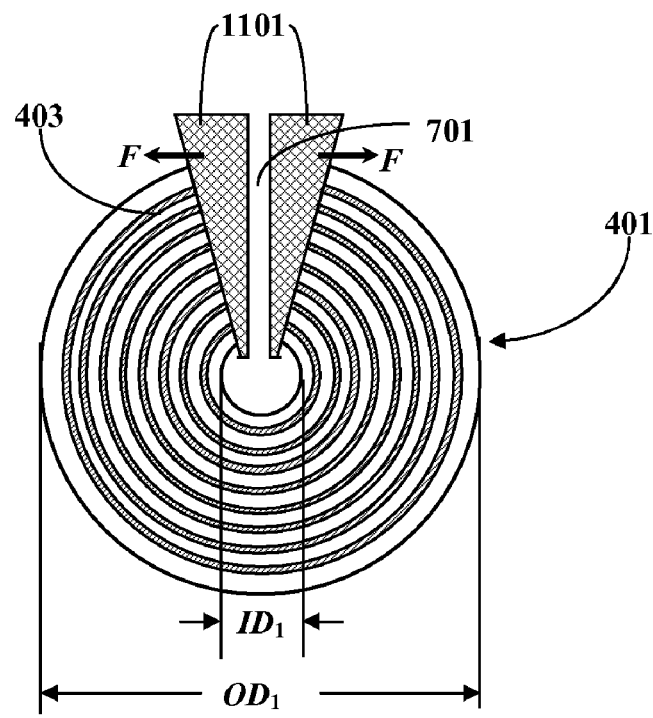
FIG. 11 is a schematic drawing illustrating the notched glass tube of FIG. 7 being reflowed with the mechanical assistance of external forces exerted via stretching arms to the side surfaces of the notch.

In step (II) of the process of the present invention, external forces other than gravity of the tube may be exerted on the ready-to-flow notched glass tube, such as on the two side surfaces of the notch or to the surface of the inner cavity, to facilitate the reflow of the glass. Such mechanical assistance of the roll-out or reflow process can expedite the reflow process or allow the roll-out to be carried out at a lower temperature. FIG. 11 schematically illustrates a ready-to-flow notched glass tube of FIG. 7 further equipped with stretching arms 1101. During the roll-out process, external force F is applied to both notch surfaces via the arms. Alternative methods for mechanically assisted roll out are possible as well.

Figure 12:
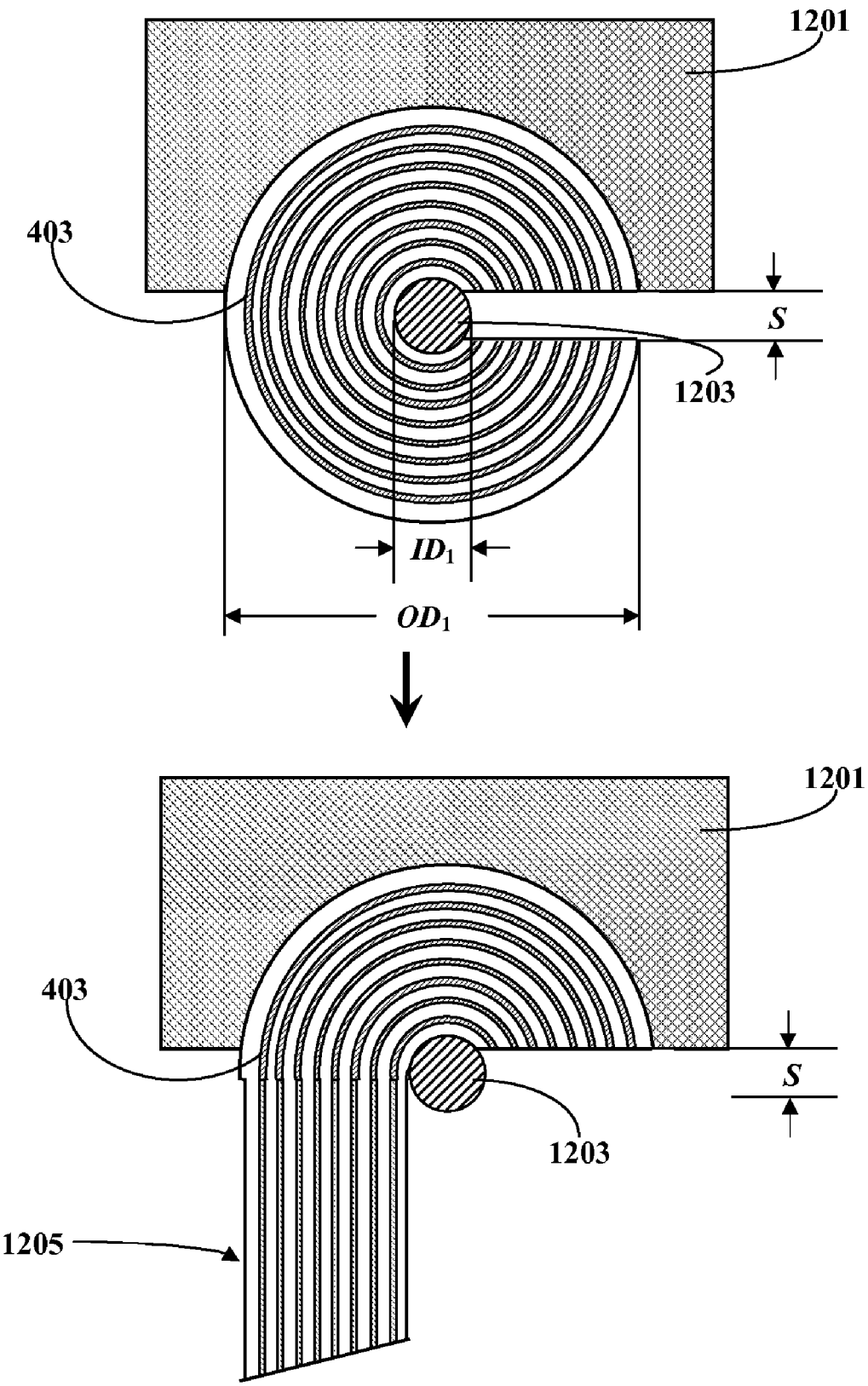
FIG. 12 is a schematic drawing illustrating a step of the roll-out of the notched glass tube of FIG. 5, in which half is reflowed under gravity, and the other half is restricted from reflow by mechanical assistance of a mandrel and an upper fixture.
Figure 13:
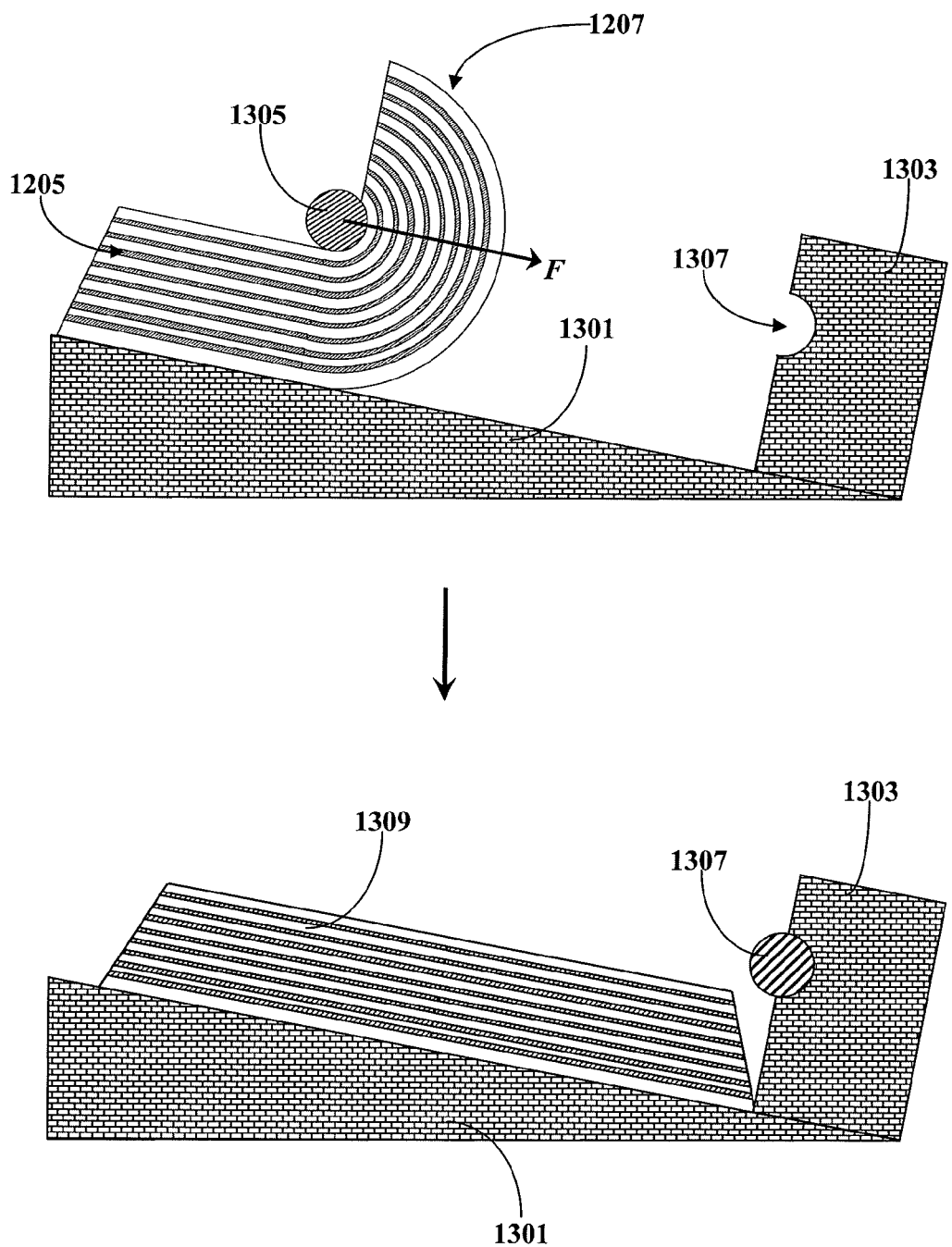
FIG. 13 is a schematic drawing illustrating the roll-out of the half reflowed glass piece showed in FIG. 12 on a slope.

FIGS. 12 and 13 illustrate an alternative approach to mechanically assisted roll-out. In FIG. 12, a notched glass tube having essentially the configuration of FIG. 5 is placed on a mandrel 1203 inserted through the inner cavity of the tube. The notch on the glass tube wall is placed sideways. A setter 1201 is placed atop the upper part of the glass tube above the notch. The entire set-up is heated to an elevated temperature to allow the lower part of the tube to roll out to an essentially vertical position to form the essentially straightened part 1205. In FIG. 13, the partially rolled-out piece of glass is placed on a slope 1301, where the un-rolled-out part of the tube 1207 is allowed to roll out. Thus at the end of the roll-out process, an essentially flat glass plate 1309 is formed on the slope. In FIG. 13, a mandrel 1305 is also illustrated. An external force F is applied to the partially rolled-out glass piece via the mandrel. At the end of the roll-out process, the mandrel 1305 is placed into a receptive notch 1307 formed on the side wall 1303.

Figure 14:
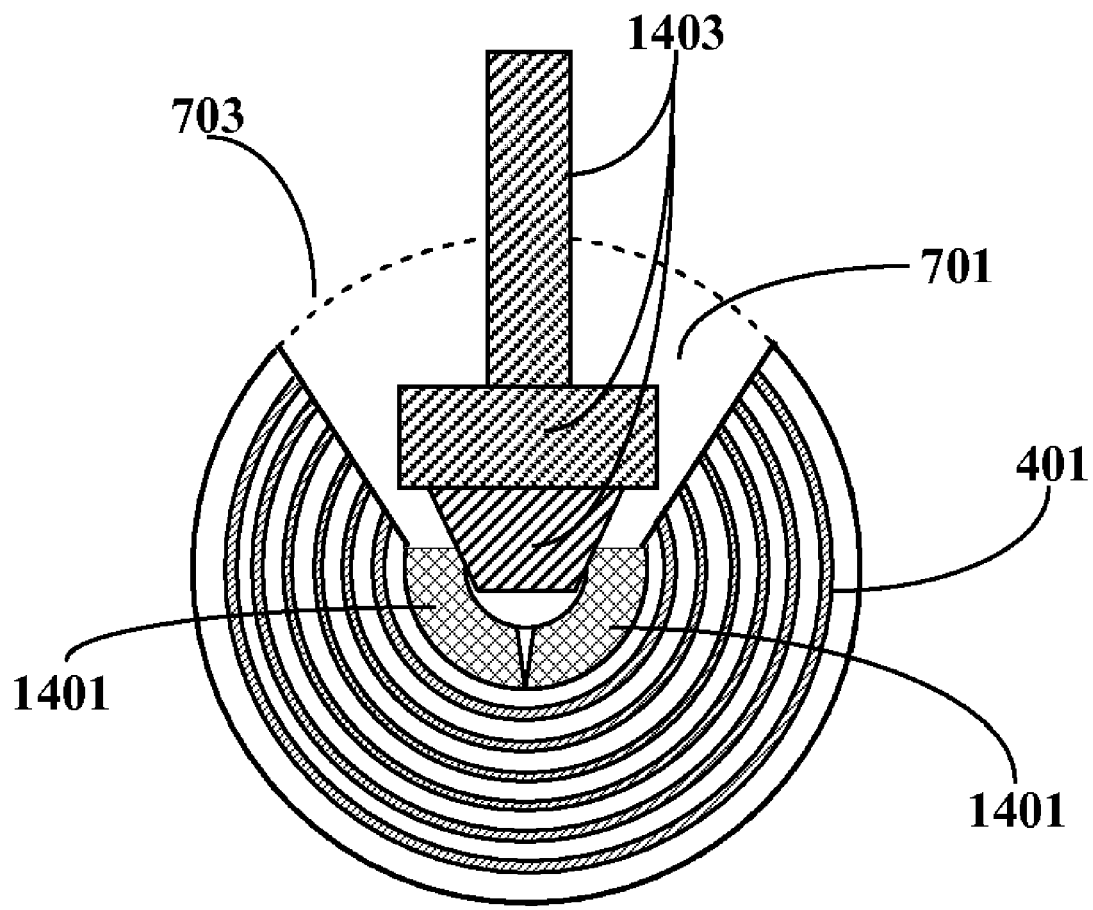
FIG. 14 is a schematic drawing illustrating the roll-out of a notched tube approximating the configuration in FIG. 7 via the mechanical assistance of a hinged articulating mandrel and a plunger.

FIG. 14 illustrates another embodiment of mechanically assisted roll-out process of the present invention. In this embodiment, a glass tube having essentially the configuration of FIG. 7 is rolled out via the assistance of an articulating mandrel 1401 and a plunger 1403. During the initial stage of the roll-out, the glass tube is essentially pressed open via the assistance of the mandrel and the plunger. Subsequently, the partially rolled-out tube having a larger opening is allowed to reflow to substantially flat as described above. The total roll-out time can be shortened significantly by using mechanical assistance.

Surprisingly, the thermal reflow process of the present invention can result in a glass plate with a birefringence map in which the fast axis directions of the measured pixels have a low randomness factor. Thus, preferably, the process of the present invention is characterized by:

in step (II), the identified section of the ready-to-flow notched glass tube forms an identified glass plate having two essentially flat major surfaces, a width of the first major flat surface of $L_3$, a width of a second major surface of $L_4$, $L_4 \geq L_3$, a length of both major surfaces of $L_2$, and a thickness between the two essentially flat major surfaces of T; and measured in a plane perpendicular to the optical axis of the identified glass plate, the identified glass plate with a surface area of about $L_3 \cdot L_2$ upon edge removal, surface lapping and annealing has a birefringence pattern in which fast axis directions have a randomness factor of between −0.50 and 0.50, preferably between −0.40 and 0.40, more preferably between −0.30 and 0.30.

The glass-plate making process of the present invention has, inter alia, the following advantages:

(1) The process allows cylindrical fused silica blanks of thick wall cross section to be used for manufacture of parts with plate and/or disc-like geometry for use in photolithography lens applications. The process is scalable.

(2) The process of the present invention can be carried out without the use of elaborate fixture in step (II). That is, the roll-out can be effected via the influence of gravity. However, as described supra, it is not ruled out that the roll-out is carried out with mechanical assistance.

(3) The process of the present invention can provide flat planar parts which do not require secondary thermal processing steps for substantial leveling or straightening.

(4) The process of the present invention is capable of providing plates of width significantly larger than initial blank diameter.

(5) Circular striae in terms of compositional variation (such as OH concentration variation) and/or property variation (such as refractive index variation) can be realigned such that they do not interfere with the optical performance of resultant glass plate without removing the striae via complex homogenization and mixing of the glass.

(6) Provides means to process OVD blanks with center core removed avoiding the issues related to the index inhomogeneity seen at the core-overclad interface.

The Squash Process described summarily and in detail above for reforming a glass cylinder constitutes a second aspect of the present invention.

A third aspect of the present invention is thus a synthetic silica body having an optical axis and a birefringence pattern as measured in a plane perpendicular to the optical axis in which fast axis directions have a randomness factor of between −0.50 and 0.50, preferably between −0.40 and 0.40, more preferably −0.30 and 0.30, still more preferably between −0.20 and 0.20. Preferably, the synthetic silica body is a plate having two essentially flat and essentially parallel major surfaces, each major surface having an area of at least 1 cm², preferably at least 4 cm², more preferably at least 16 cm². In certain embodiments, each of the major surfaces has an area of at least 100 cm². In other embodiments, each of the major surfaces has an area of at least 225 cm², such as about 400 cm², 625 cm², 900 cm², or even larger. Preferably, the synthetic silica body has a refractive index variation $\Delta n$ as measured in a plane perpendicular to the optical axis, wherein Δn≦10 ppm, preferably Δn≦5 ppm, more preferably Δn≦1 ppm, most preferably Δn≦0.5 ppm. Preferably, the synthetic silica glass body of the present invention has an internal transmission at about 193 nm of about 99.65% cm$^{-1}$, more preferably at least 99.70% cm$^{-1}$, still more preferably at least 99.75% cm$^{-1}$, still more preferably at least 99.80% cm$^{-1}$, most preferably at least 99.85% cm$^{-1}$. Preferably, the synthetic silica body of the present invention has a low level of LIWFD. Preferably, the synthetic silica body of the present invention has a birefringence of less than 5 nm/cm, preferably less than 3 nm/cm, more preferably less than 1 nm/cm, most preferably less than 0.5 nm/cm, when measured in a plane perpendicular to the optical axis. Preferably, the synthetic silica body of the present invention has a fictive temperature of lower than 1150° C., preferably lower than 1050° C., more preferably lower than 1000° C., most preferably lower than about 900° C.

Figure 15:
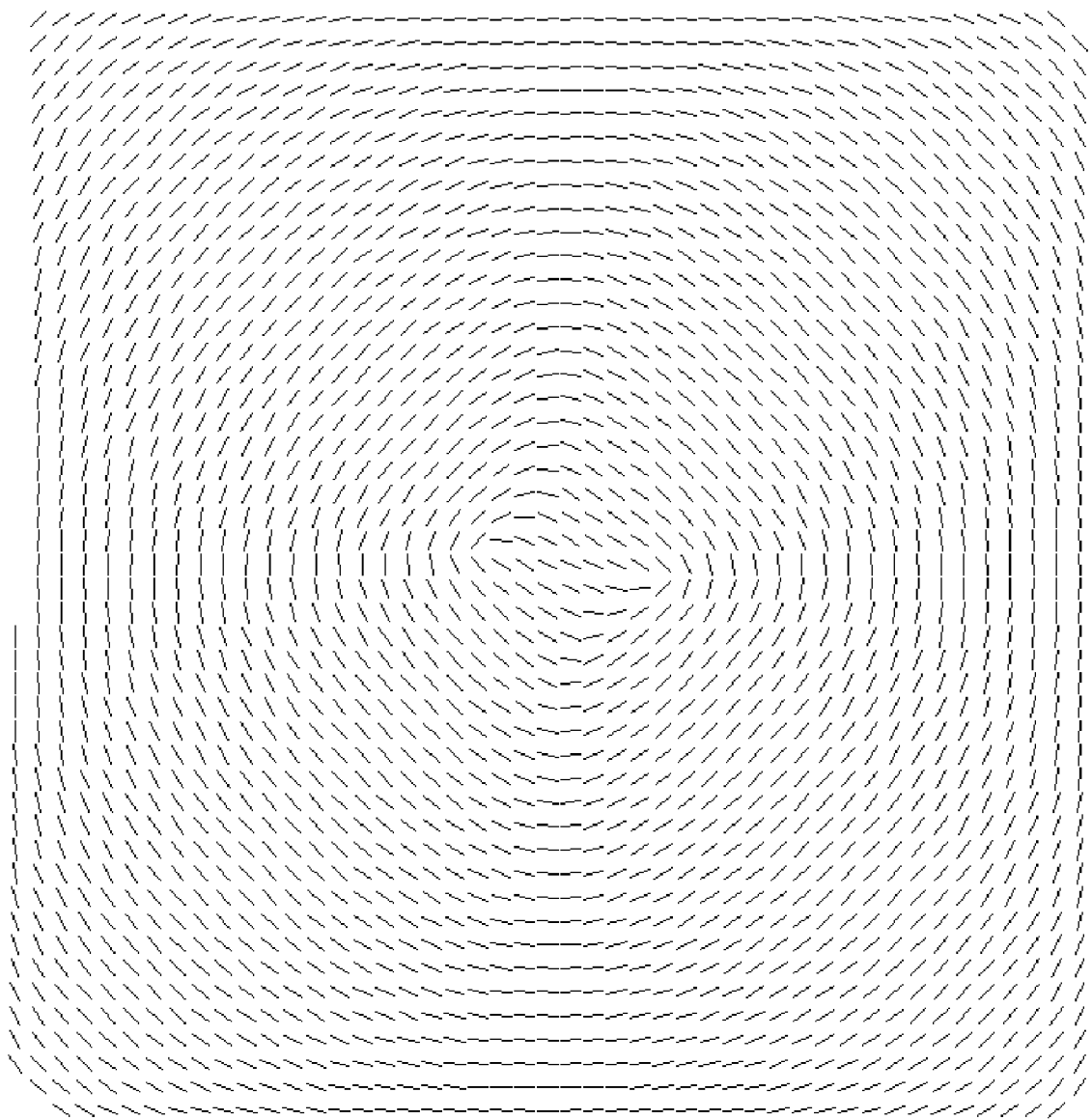
FIG. 15 is a birefringence map (showing directions of the fast axes only) of a piece of fused silica glass having a tangential pattern of fast axis direction distribution.
Figure 16:
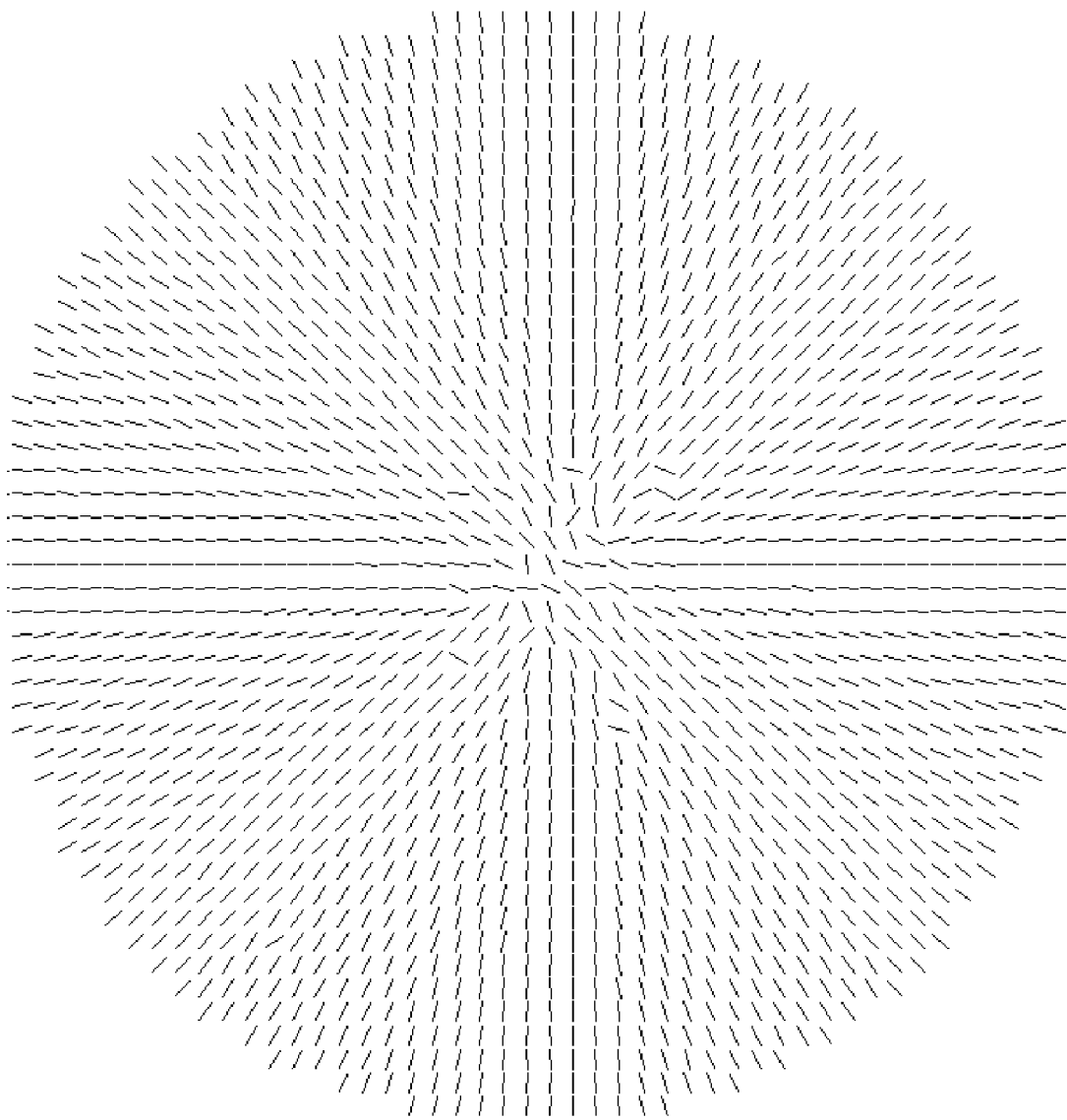
FIG. 16 is a birefringence map (showing directions of the fast axes only) of a piece of fused silica glass having a radial pattern of fast axis direction distribution.
Figure 17:
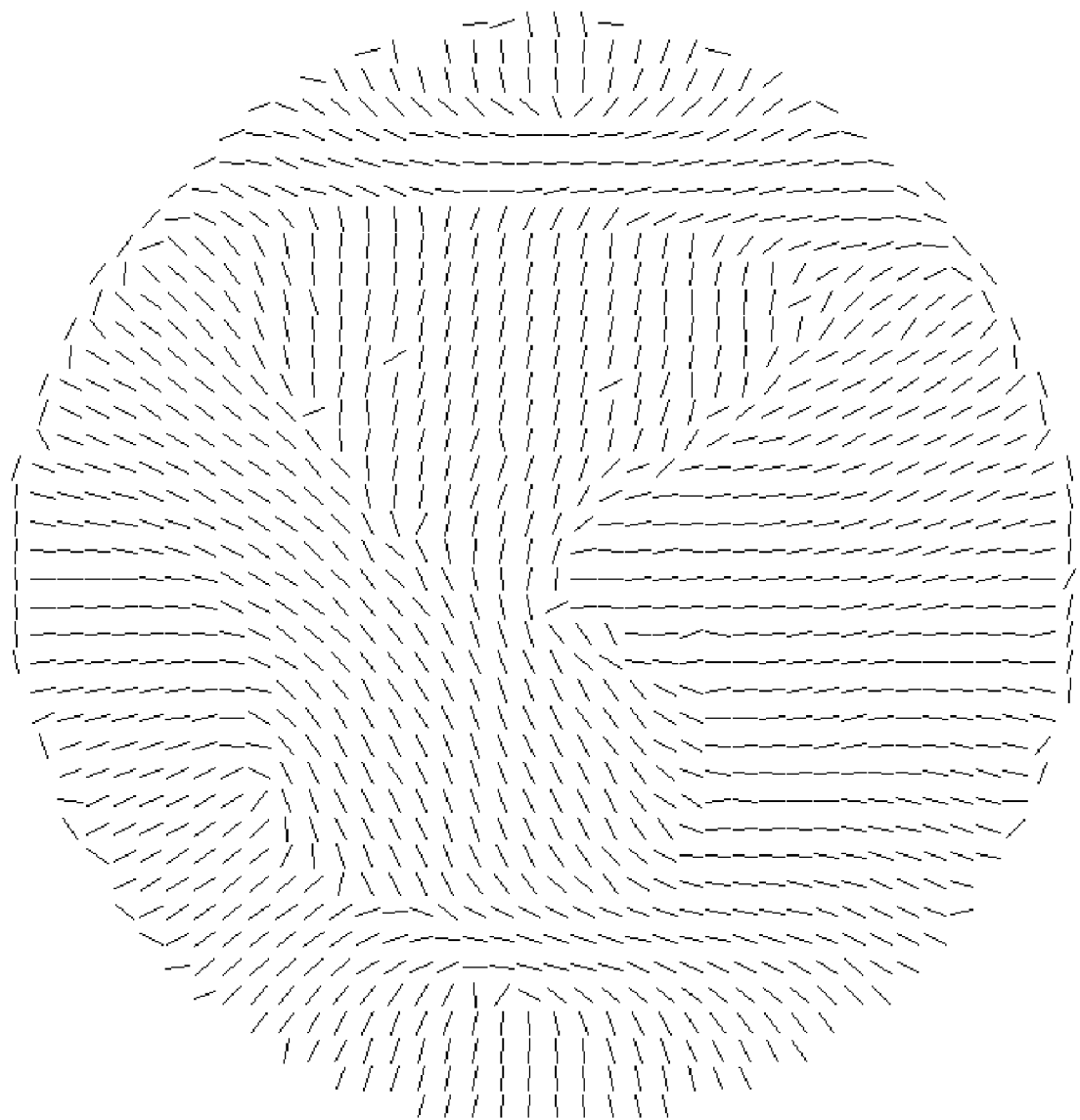
FIG. 17 is a birefringence map (showing directions of the fast axes only) of a piece of fused silica glass of the present invention having a mixed pattern of fast axis direction distribution.

The birefringence of a glass body, such as a fused silica blank, is usually analyzed by dividing the glass body aperture into an array of pixel elements and then using a polarimeter to measure the magnitude and fast axis direction of each pixel element. The "randomness" of the birefringence fast axis directions can be assessed either with a simple visual evaluation of the birefringence map or through equations which average the direction of the birefringence over the clear aperture of the glass body. It has been found that, as shown in FIG. 15, certain silica glass plates exhibit a tangential pattern, meaning that a majority of the glass volume has fast birefringence axes which are perpendicular to radial lines. With this birefringence profile, the direction vectors produce a "tree ring" pattern. As shown in FIG. 16, certain other silica glass plates exhibit a radial pattern, meaning that a majority of the glass volume has fast birefringence axes which are parallel to any radial line. With this birefringence profile the direction vectors produce a "star burst" pattern. FIG. 17 shows the fast birefringence axis pattern of a glass produced using the roll-out reflow process of the present invention. Its direction vectors show a mixed pattern in which no particular orientation is dominant.

As used herein, the randomness factor of fast axis directions (FR) is calculated from a birefringence map as follows:

$$FR = \sum \frac{[|\cos(\theta - \gamma)| - |\sin(\theta - \gamma)|]}{N}$$

where:
  $\theta$ is the angle of the pixel on the measured glass body in spherical coordinates;
  $\gamma$ is the orientation angle of the fast axis of the measured birefringence in the pixel;
  N is the number of pixels measured in the aperture; and
  the operator |x| means the absolute value of x.

The FR as so defined ranges between −1 and 1. When it is equal to −1, the fast axis profile is tangential ("tree rings" pattern). When it is equal to +1, the pattern is radial ("star burst" pattern). A value of zero represents complete randomness of the direction of the fast axes of the birefringence in those measured pixels. As an example, applying this formula to the fast axis maps given above generates the following values:

| FIG. No. | FR | Visual Birefringence Pattern |
|---|---|---|
| 15 | −0.88 | tangential |
| 16 | +0.93 | radial |
| 17 | −0.36 | mixed |

A fourth aspect of the present invention is an optical element having an optical axis which is made from the synthetic silica body described supra. Preferably, the optical axis of the optical element is parallel to the optical axis of the synthetic silica body. In a preferred embodiment, the optical element is a lens element for use in lithographic device operating in deep or vacuum UV wavelength regions, such as about 248 nm, 193 nm and shorter. In another preferred embodiment, the optical element is a photomask substrate for use in lithographic devices, such as those operating in deep or vacuum UV wavelength regions, such as at about 248 nm, 193 nm and shorter. In other embodiments, the optical element of the present invention can be used in laser generators, sputter targets, mirrors, optical inspecting devices, and the like.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making glass plate comprising the following steps:
   (I) providing a ready-to-flow notched glass tube having (a) a longitudinal tube center axis, (b) an identified section between two cross-sections perpendicular to the tube center axis having a longitudinal section length L1; and (c) a notch in the direction of the tube center axis of the ready-to-flow notched glass tube through the tube wall; and
   (II) thermally reflowing the ready-to-flow notched glass tube thus formed in step (I) at an elevated temperature to form a glass having a refractive index variation of less than or equal to 10 ppm, wherein the step of thermal reflowing comprises:
   (IIa) placing the ready-to-flow notched glass-tube on an essentially horizontal longitudinal mandrel, with the mandrel inserting into the inner cavity of the tube, and the notch placed facing sideways;
   (IIb) allowing the lower part of the notched glass tube to roll out to an essentially vertical position while restricting the upper part from rolling out, to result in a partially rolled out glass piece;
   (IIc) placing the partially rolled out glass piece on an inclined surface; and
   (IId) allowing imposing an external force on the mandrel to mechanically assist the partially rolled out glass piece to roll-out on the inclined surface to form an essentially flat glass plate.

2. A process in accordance with claim 1, wherein the glass tube has striae when viewed in the direction of the tube center axis.

3. A process in accordance with claim 2, wherein the glass tube has essentially circular striae when viewed in the direction of the tube center axis.

4. A process in accordance with claim 3, wherein after step (II), the striae are re-oriented to be essentially parallel to the two major surfaces of the resultant glass plate.

5. A process in accordance with claim 3, wherein after step (II), when viewed in the direction of the optical axis of the resultant glass plate, the glass plate is essentially free of striae.

6. A process in accordance with claim 5, wherein after step (II), when viewed in at least one direction perpendicular to the optical axis of the resultant glass plate, the glass plate is essentially free of striae.

7. A process in accordance with claim 5, wherein after step (II), when viewed in the direction of the center tube axis of the ready-to-flow glass tube, the resultant glass plate is essentially free of striae.

8. A process in accordance with claim 1, wherein the glass is consolidated fused silica.

9. A process in accordance with claim 8, wherein the silica glass is produced by outside vapor deposition.

10. A process in accordance with claim 8, wherein the silica glass is produced by inside vapor deposition.

11. A process in accordance with claim 8, wherein the glass is high purity consolidated fused silica and step (II) is conducted in the presence of a purifying atmosphere comprising a cleansing gas.

12. A process in accordance with claim 11, wherein the cleansing gas comprised in the purifying atmosphere is selected from $F_2$, $Cl_2$, $Br_2$, a halogen-containing compound, and compatible mixtures thereof.

13. A process in accordance with claim 1, wherein in step (I), the notch is formed to have a center plane passing through the tube center axis of the ready-to-flow notched glass tube, and the two sides of the notch beside the center plane are essentially symmetric.

14. A process in accordance with claim 1, wherein in step (I), the notch is formed to have two essentially parallel sides.

15. A process in accordance with claim 1, wherein in step (I), the notch is formed to have an essentially truncated "V" shape cross-section when cut by a plane perpendicular to the tube center axis of the ready-to-flow notched glass tube.

16. A process in accordance with claim 1, wherein in step (I), the provided ready-to-flow notched glass tube has a cross-section that is part of a ring-shape defined by an essentially circular outer boundary having a diameter of $OD_1$ and an essentially circular inner boundary having a diameter of $ID_1$ when cut by a plane perpendicular to the center axis of the tube.

17. A process in accordance with claim 16, wherein in step (I), the outer boundary and the inner boundary of the ring-shape are essentially concentric.

18. A process in accordance with claim 16, wherein in step (I), the outer boundary and the inner boundary of the ring shape are essentially eccentric.

19. A process in accordance with claim 18, wherein in step (I), the notch is formed at the location such that the center plane of the notch is where the thickness of the wall of the ready-to-flow notched glass tube is essentially the minimal.

20. A process in accordance with claim 16, wherein in step (II), the identified section of the ready-to-flow notched glass tube is formed into a glass plate having two essentially flat major surfaces, a width of a first major flat surface of $L_3$, a width of a second major surface of $L_4$, $L_4 \geq L_3$, a length of both major surfaces of $L_2$, and a thickness between the two essentially flat major surfaces of T.

21. A process in accordance with claim 20, wherein $\pi \cdot OD_1 - L_{arc} \leq L_4 \leq 2(\pi \cdot OD_1 - L_{arc})$, where $L_{arc}$ is the outer arc length of the notch.

22. A process in accordance with claim 20, wherein $L_3 \geq 1.0 \pi \cdot ID_1$.

23. A process in accordance with claim 20, wherein $0.10 \cdot (OD_1 - ID_1) \leq T \leq 0.45 \cdot (OD_1 - ID_1)$.

24. A process in accordance with claim 1, wherein in step (II), the identified section of the ready-to-flow notched glass tube is formed into a glass plate having two essentially flat major surfaces, a width of a first major flat surface of $L_3$, a width of a second major surface of $L_4$, $L_4 \geq L_3$, a length of both major surfaces of $L_2$, and a thickness between the two essentially flat major surfaces of T.

25. A process in accordance with claim 24, wherein $L_1 \leq L_2 \leq 2L_1$.

26. A process in accordance with claim 24, wherein $L_3 \geq 0.5 L_4$.

27. A process in accordance with claim 1, wherein:
in step (II), the identified section of the ready-to-flow notched glass tube forms an identified glass plate having two essentially flat major surfaces, a width of the first major flat surface of $L_3$, a width of a second major surface of $L_4$, $L_4 \geq L_3$, a length of both major surfaces of $L_2$, and a thickness between the two essentially flat major surfaces of T; and
measured in a plane perpendicular to the optical axis of the identified glass plate, the identified glass plate upon edge removal and surface lapping with a surface area of about $L_3 \cdot L_2$ has a birefringence pattern in which fast axis directions have a randomness factor between −0.50 and 0.50.

28. A process in accordance with claim 1, wherein step (I) comprises the following steps:
(Ia) providing a precursor glass tube having (a) a longitudinal tube axis, and (b) an identified section between two cross-sections perpendicular to the tube axis having a longitudinal section length $L_1$; and
(Ib) forming a notch in the direction of the tube axis of the precursor glass tube through the tube wall, whereby the ready-to-flow notched glass tube is formed.

29. A process in accordance with claim 28, wherein the glass is silica and step (Ia) comprises the following steps:
(Ia1) forming a silica soot preform by the OVD process on a mandrel;
(Ia2) consolidating the silica soot preform into fused silica glass without previously removing the mandrel; and
(Ia3) removing the mandrel to form the precursor glass tube.

30. A process in accordance with claim 28, wherein the glass is silica and step (Ia) comprises the following steps:
(Ia1) forming a silica soot preform by the OVD process on a mandrel;
(Ia2) removing the mandrel from the soot preform; and
(Ia3) consolidating the silica soot preform into fused silica glass, whereby the precursor glass tube is formed.

31. A process in accordance with claim 28, wherein the glass is silica; and step (Ia) comprises the following steps:
(Ia1) forming a silica soot preform by the OVD process on a glass tube mandrel;
(Ia2) consolidating the silica soot preform into fused silica glass without previously removing the mandrel, whereby the precursor glass tube is formed.

32. A process in accordance with claim 31 comprising the following step (III) after step (II):
(III) removing the surface part of the glass plate resulting from the glass tube mandrel.

33. A process in accordance with claim 28, wherein the glass is silica and step (Ia) comprises the following steps:
(Ia1) forming a silica soot preform by the IVD process on the inner surface of an outside tube;
(Ia2) consolidating the silica soot preform into fused silica glass without previously removing the outside tube; and
(Ia3) removing the outside tube to form the precursor glass tube.

34. A process in accordance with claim 28, wherein the glass is silica and step (Ia) comprises the following steps:
(Ia1) forming a silica soot preform by the IVD process on the inner surface of an outside tube;
(Ia2) removing the outside tube from the soot preform; and
(Ia3) consolidating the silica soot preform into fused silica glass, whereby the precursor glass tube is formed.

35. A process in accordance with claim 28, wherein the glass is silica and step (Ia) comprises the following steps:
(Ia1) forming a silica soot preform by the IVD process on the inner surface of an outside tube; and
(Ia2) consolidating the silica soot preform into fused silica glass without previously removing the outside tube, whereby the precursor glass tube is formed.

36. A process in accordance with claim 35 comprising the following step (III) after step (II):
(III) removing the surface part of the glass plate resulting from the outside tube.

37. A process in accordance with claim 28, wherein step (Ia) comprises the following steps:
(I0) providing a precursor glass cylinder having a precursor cylinder axis, a length $L_0$ in the direction of the precursor cylinder axis and a precursor cylinder outer diameter $OD_0$;
(I1) thermally reflowing, with optional pressing, the precursor glass cylinder; and
(I2) optionally drilling in a direction essentially parallel to the precursor cylinder axis to form a cylindrical center cavity,
whereby the precursor glass tube is formed to have a longitudinal tube axis, an outer diameter $OD_1$ and a length $L_1$ in the direction of the tube axis, where the tube axis is essentially parallel to the precursor cylinder axis of the precursor glass cylinder, $L_1<L_0$, and $OD_1>OD_0$.

38. A process in accordance with claim 37, wherein $0.3L_0 \leq L_1 \leq 0.8L_0$.

39. A process in accordance with claim 37, wherein:
in step (I0), the precursor glass cylinder comprises an inner glass cane; said inner glass cane is located approximately at the center of the precursor glass cylinder and has a diameter of $ID_0$; and
in step (I2), the inner glass cane is essentially completely removed.

40. A process in accordance with claim 39, wherein after step (I2), the precursor glass tube has an inner cylindrical cavity with a diameter $ID_1$, and $OD_0-ID_0<OD_1-ID_1$.

41. A process in accordance with claim 37, wherein in step (I0), the precursor glass cylinder comprises a mandrel in essentially the central portion.

42. A process in accordance with clam 41, wherein the mandrel is maintained in place during step (I1), and removed after step (I1).

43. A process in accordance with claim 42, wherein the dimension of the mandrel is essentially not changed during step (I1).

44. A process in accordance with claim 41, wherein the mandrel is inserted into a glass tube.

45. A process in accordance with claim 37, wherein in step (I0), the precursor glass cylinder comprises an outside tube having composition and/or properties differing from those of the glass enclosed in the outside tube.

46. A process in accordance with claim 45 comprising the following step (III) after step (II):
(III) removing the surface part of the glass plate resulting from the outside tube.

47. A process in accordance with claim 37, wherein in step (I0), the provided precursor glass cylinder has an inner cylindrical cavity the axis of which is parallel to the precursor cylinder axis, and the inner cylindrical cavity has a diameter of $ID_0$.

48. A process in accordance with claim 47, wherein after step (I2), the ready-to-flow glass tube has an inner cylindrical cavity with a diameter $ID_1$, and $OD_0-ID_0<OD_1-ID_1$.

49. A process in accordance with claim 1, wherein in step (IIb), the reflow is done without external mechanical assistance.

50. A process in accordance with claim 1, wherein in step (II), the temperature elevation rate is between 50-600° C./minute between the annealing point of the glass and the highest temperature.

51. A process in accordance with claim 50, wherein in step (II), the temperature elevation rate is between 180-600° C./minute between the annealing point of the glass and the highest temperature.

52. A process in accordance with claim 1, wherein in step (II), the temperature is held for a period of between 10 minutes to 5 hours, at a temperature between the annealing point and the devitrification range of the glass.

* * * * *